(12) United States Patent
Green et al.

(10) Patent No.: US 11,129,323 B2
(45) Date of Patent: Sep. 28, 2021

(54) SYSTEM AND A METHOD FOR OPTIMIZING THE TRAJECTORY TO BE FOLLOWED WHEN WEEDING CROPS

(71) Applicant: Agro Intelligence APS, Aarhus (DK)

(72) Inventors: Ole Green, Lem (DK); Gareth Thomas Charles Edwards, Aarhus (DK)

(73) Assignee: Agro Intelligence APS, Aarhus N (DK)

(*) Notice: Subject to any disclaimer, the term of this patent is extended or adjusted under 35 U.S.C. 154(b) by 28 days.

(21) Appl. No.: 16/338,104

(22) PCT Filed: Sep. 29, 2017

(86) PCT No.: PCT/DK2017/050323
§ 371 (c)(1),
(2) Date: Mar. 29, 2019

(87) PCT Pub. No.: WO2018/059648
PCT Pub. Date: Apr. 5, 2018

(65) Prior Publication Data
US 2019/0216003 A1    Jul. 18, 2019

(30) Foreign Application Priority Data
Sep. 29, 2016  (DK) .................................. 201600574

(51) Int. Cl.
*A01B 79/00*   (2006.01)
*A01B 69/04*   (2006.01)
*G01C 21/00*   (2006.01)

(52) U.S. Cl.
CPC .......... *A01B 79/005* (2013.01); *A01B 69/008* (2013.01); *G01C 21/00* (2013.01)

(58) Field of Classification Search
CPC ...... A01B 79/005; A01B 69/008; G01C 21/00
(Continued)

(56) References Cited

U.S. PATENT DOCUMENTS

| 6,128,574 A | 10/2000 | Diekhans |
| 8,285,459 B2 * | 10/2012 | Diekhans ............. A01B 69/007 |
| | | 701/50 |

(Continued)

FOREIGN PATENT DOCUMENTS

| DK | 0821296 T3 | 2/2003 |
| DK | 201200174 U3 | 1/2013 |

(Continued)

OTHER PUBLICATIONS

International Preliminary Report on Patentability from International Application No. PCT/DK2017/050323, dated Sep. 6, 2018, 15 pages.

(Continued)

*Primary Examiner* — Abby Y Lin
*Assistant Examiner* — Hossam M Abd El Latif
(74) *Attorney, Agent, or Firm* — TraskBritt

(57) ABSTRACT

The present disclosure relates to a support system for determining a trajectory to be followed by an agricultural work vehicle when weeding distinct areas of weed within a field of crops, the system comprising: a mapping unit configured for receiving: i) coordinates relating to the boundaries of a field to be worked; and ii) coordinates relating to the boundaries of distinct areas of weed being located within the boundary of the field of crops; a capacity parameter unit configured for receiving one or more capacity parameters relating to the working vehicle; a trajectory calculating unit configured for calculating an optimized trajectory to be followed by the work vehicle upon weeding the distinct areas of weed; wherein the optimized trajectory is being calculated on the basis of the coordinates received by the mapping unit; and one or more of the one or more capacity parameters received by the capacity parameter unit.

18 Claims, 29 Drawing Sheets

(58) Field of Classification Search
USPC .......................................................... 701/450
See application file for complete search history.

(56) References Cited

U.S. PATENT DOCUMENTS

| | | | |
|---|---|---|---|
| 8,396,730 B2* | 3/2013 | Khosla | G06Q 10/0631 |
| | | | 705/7.11 |
| 8,498,788 B2* | 7/2013 | Kondekar | G05D 1/0219 |
| | | | 701/50 |
| 2011/0153172 A1* | 6/2011 | Anderson | A01B 69/008 |
| | | | 701/50 |
| 2011/0224933 A1* | 9/2011 | Hood | G06Q 10/06 |
| | | | 702/81 |
| 2012/0101725 A1 | 4/2012 | Kondekar | |
| 2016/0146611 A1 | 5/2016 | Matthews | |
| 2017/0131718 A1 | 5/2017 | Matsumura et al. | |

FOREIGN PATENT DOCUMENTS

| | | |
|---|---|---|
| EP | 2338322 A2 | 6/2011 |
| WO | 2015/006600 A1 | 1/2015 |
| WO | 2016/009688 A1 | 1/2016 |

OTHER PUBLICATIONS

International Search Report from International Application No. PCT/DK2017/050323, dated Dec. 22, 2017, 4 pages.
International Written Opinion from International Application No. PCT/DK2017/050323, dated Dec. 22, 2018, 9 pages.
Bakhtiari et al. Optimal Route of Planning of Agricultural Field Operations Using Ant Colony Optimization, Agricultural Engineering International, CIGR Journal, 13(4).
Denmark Search Report for DK Application No. 201600574 dated Mar. 8, 2017, 4 pages.
Hameed et al., Automated Generation of Guidance Lines for Operational Field Planning, 2010, Biosystems Engineering, 107(4), pp. 294-306.
Hameed et al., Task and Motion Planning for Selective Weed Control Using a Team of Autonomous Vehicles, Dec. 2014, In Control Automation Robotics & Vision (ICARCV), 2014 13th International Conference on (pp. 1853-1857), IEEE.

* cited by examiner

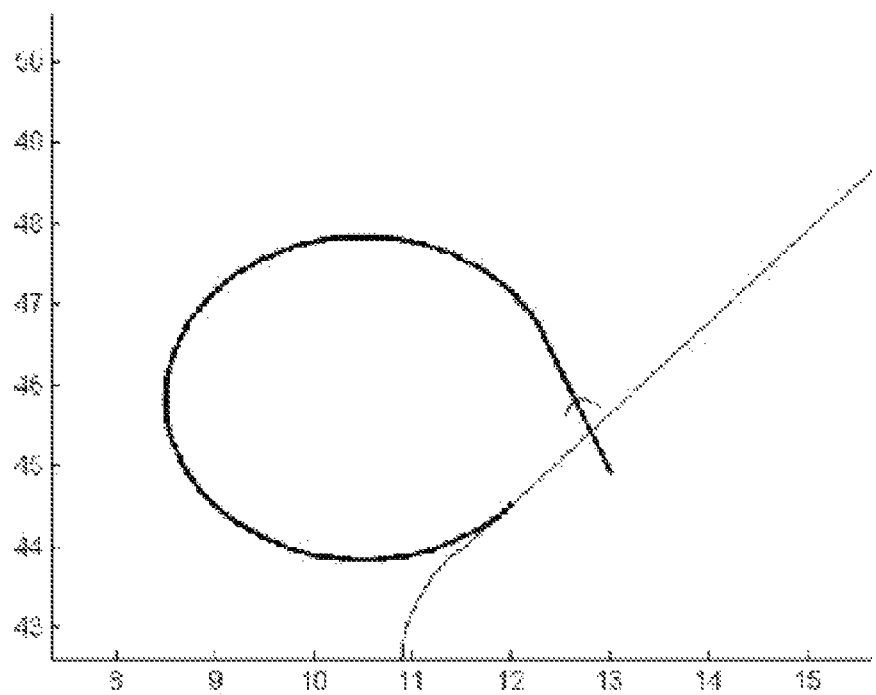
Fig. 21    a
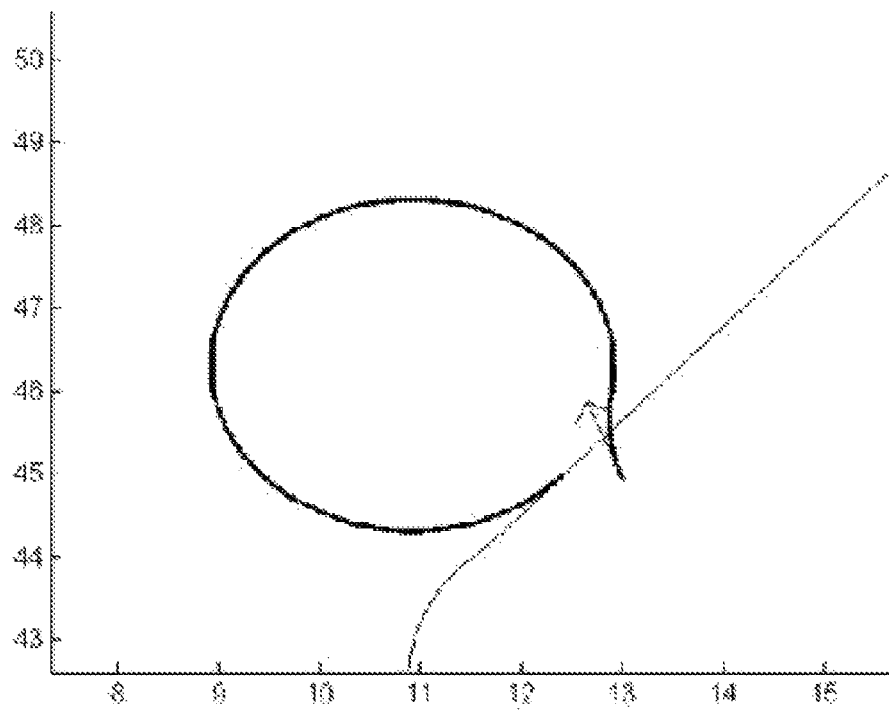
Fig. 21    b

SYSTEM AND A METHOD FOR OPTIMIZING THE TRAJECTORY TO BE FOLLOWED WHEN WEEDING CROPS

CROSS-REFERENCE TO RELATED APPLICATIONS

This application is a national phase entry under 35 U.S.C. § 371 of International Patent Application PCT/DK2017/050323, filed Sep. 29, 2017, designating the United States of America and published in English as International Patent Publication WO 2018/059648 A1 on Apr. 5, 2018, which claims the benefit under Article 8 of the Patent Cooperation Treaty to Danish Patent Application Serial No. PA 2016 00574, filed Sep. 29, 2016, the disclosure of each of which is hereby incorporated herein in its entirety by this reference.

TECHNICAL FIELD

The present disclosure generally relates to the field of optimizing work trajectories of agricultural working vehicles for working a field.

More specifically, the present disclosure relates in a first aspect to a support system for determining a trajectory to be followed by an agricultural work vehicle when weeding distinct areas of weed in a crop field.

In a second aspect, the present disclosure relates to a method for optimizing a trajectory to be followed by an agricultural work vehicle when weeding distinct areas of weed in a crop field.

In a third aspect, the present disclosure relates to a computer program product that, when being loaded or operating on a computer, is adapted to perform the method according to the second aspect.

In a fourth aspect, the present disclosure relates to an agricultural work vehicle comprising a weeding implement as well as a support system according to the first aspect.

In a fifth aspect, the present disclosure relates to the use of a system according to the first aspect of the present disclosure, or of a computer program product according to the third aspect of the present disclosure, or of an agricultural work vehicle according to the fourth aspect of the present disclosure for optimizing a trajectory to be followed by the work vehicle when working a field.

BACKGROUND

Within the specific field of agriculture relating to growing crops, it has been a practice for several decades to increase crop yield by suppressing the growth of weed located in the crop field.

Such suppressing of the growth of weed may be performed mechanically by an agricultural working implement that mechanically works the soil in the areas of the weed. Alternatively, the weed control may be performed chemically by using a spreader spreading an herbicide to the weed.

Very often the weed plants tend to cluster together in clusters of weed, rather than being distributed evenly over the whole area of the crop field.

The reason for this is that the outcome of the competition in the early stages of growth between the crop seedlings on the one hand and the weed seedlings on the other hand, will be decisive as to which species, crop or weed, will conquer the soil and suppress growth of the other species. Accordingly, once a species, crop or weed dominates an area during seedling, that species will be able to suppress growth of the other species.

The consequence of this is that crop fields often comprises distinct areas of weed located within the crop field itself.

In modern farming, weed control will typically be performed using a motorized agricultural working vehicle, such as a tractor carrying or towing a weeding implement.

Most farmers before weeding a crop field comprising distinct areas of weed will obtain information as to the locations of each distinct area of weed within the crop field. Such information may easily be obtained using a drone comprising a camera. By overflying the crop field with a drone, optionally being equipped with an infrared sensitive camera, the farmer may gain accurate information as to the locations of the distinct areas of weed. This data may also be obtained during other in field operations or by walking through the field to make note of the weed areas.

Once being in possession of information as to the location of the distinct areas of weed within a crop field, the farmer may commence weeding those areas.

However, as the location of the distinct areas of weed within a specific crop field may vary from year to year, most farmers when weeding such distinct areas of weed within a crop field tend to cover the entire field indiscriminately to ensure all weed areas have been covers, rather than following a more intelligent and thus more efficient route through the crop field.

The disadvantages covering the entire field, and hence not following an optimum route through the crop field is that an overall inefficiency results. This inefficiency may relate to excessive time spent in weeding, excessive fuel consumption used, excessive distance travelled through healthy crop areas, excessive areas covered more than once, and excessive wear on the working implement or machinery.

Accordingly there is a persistent need for improving efficiency when weeding distinct areas of weed within a crop field.

It is an objective of the present disclosure to provide systems, uses and methods for improving efficiency when weeding distinct areas of weed within a crop field. Specifically, it is an objective of the present disclosure to provide systems, uses and methods for determining an optimized trajectory to be followed by an agricultural weeding implement upon weeding distinct areas of weed within a crop field.

BRIEF SUMMARY

This objective is achieved by the present disclosure in its first, second, third, fourth and fifth embodiments, respectively.

Accordingly, in a first aspect, the present disclosure relates to a support system for determining a trajectory to be followed by an agricultural work vehicle, when weeding distinct areas of weed within a field of crops, the system comprising:
  a mapping unit configured for receiving:
    i) coordinates relating to the boundaries of a field to be worked; and
    ii) coordinates relating to the boundaries of distinct areas of weed being located within the boundary of the field of crops;
  a capacity parameter unit configured for receiving one or more capacity parameters relating to the working vehicle;
  a trajectory calculating unit configured for calculating an optimized trajectory to be followed by the work vehicle upon weeding the distinct areas of weed; wherein the optimized trajectory is being calculated on the basis of the coordinates received by the mapping unit; and one or more of the one or more capacity parameters received by the capacity parameter unit.

In a second aspect, the present disclosure relates to a method for determining a trajectory to be followed by an agricultural work vehicle, when weeding distinct areas of weed within a field of crops, the method comprising the steps:
a) providing information relating to:
   i) coordinates relating to the boundaries of a field to be worked; and
   ii) coordinates relating to the boundaries of distinct areas of weed being located within the boundary of the field of crops;
b) providing information relating to:
   one or more capacity parameters relating to the working vehicle;
c) performing a calculation of an optimized trajectory to be followed by the work vehicle; wherein the optimized trajectory is being calculated on the basis of the coordinates provided in step a) and b).

In a third aspect, the present disclosure relates to a computer program product that, when loaded or operating on a computer, is adapted to perform the method according to the second aspect of the present disclosure.

In a fourth aspect, the present disclosure relates to an agricultural work vehicle comprising a support system according to the first aspect of the present disclosure.

In a fifth aspect, the present disclosure relates to a use of a support system according to the first aspect of the present disclosure, or of a computer program product according to the third aspect of the present disclosure; or of an agricultural work vehicle according to the fourth aspect of the present disclosure.

The present disclosure in its various aspects provides for optimizing a route to follow upon weeding a crop field comprising a number of distinct weed areas. The optimization may be an optimization in relation to one or more of the following: total operational time for working the field; total productive time for weeding the distinct areas of weed; total fuel consumption for working the field; total non-working distance for working the field, total distance of travel through non-weed crop areas, total area covered more than once.

DETAILED DESCRIPTION

Figure 1:
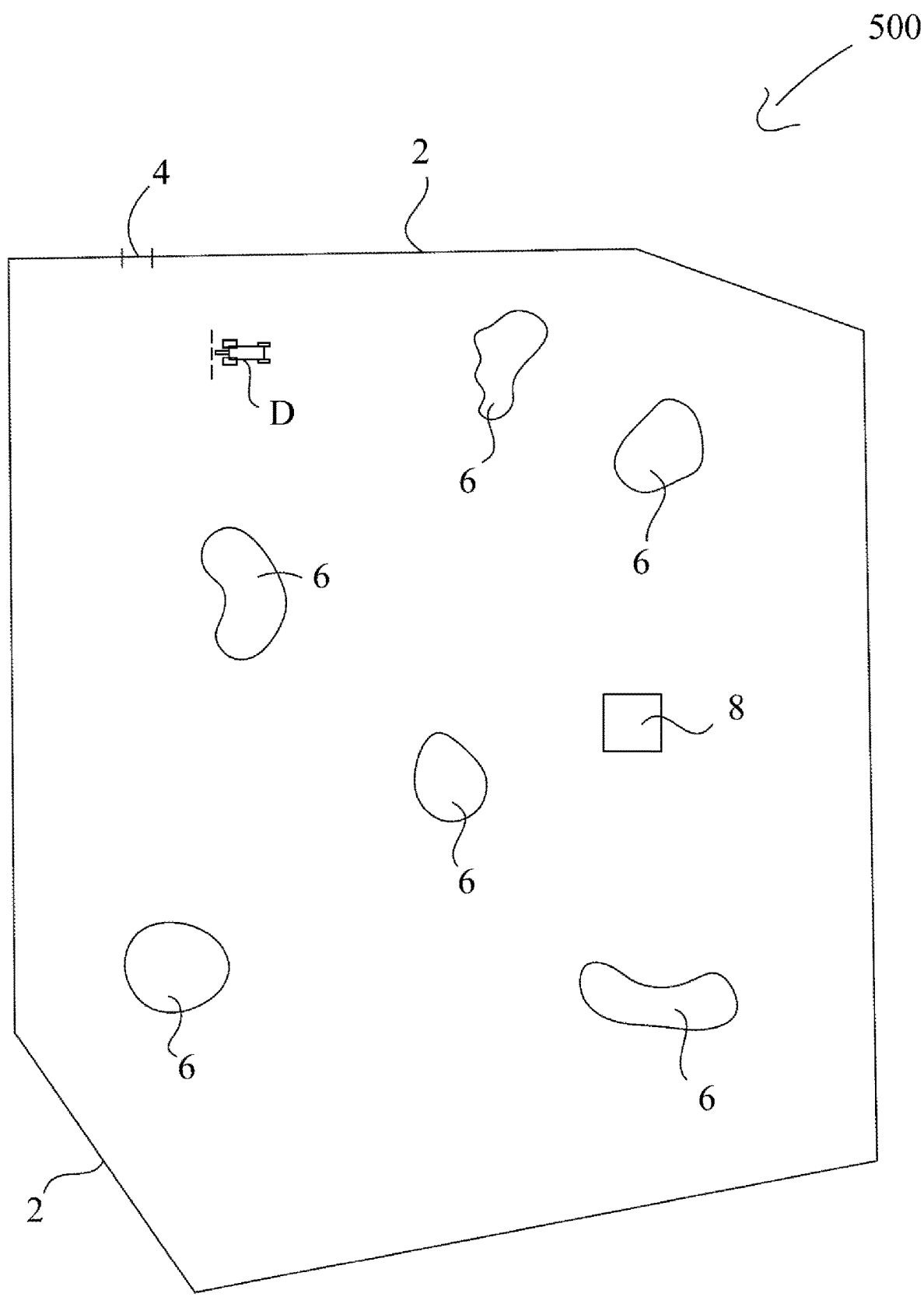
FIG. 1 is a top view of a field comprising a number of distinct areas of weed located within its boundary of a crop field and illustrates the problems associated with working such a field.

The present disclosure relates to a support system for determining a trajectory to be followed by an agricultural work vehicle when weeding distinct areas of weed within a field of crops, the system comprising:
a mapping unit configured for receiving:
   i) coordinates relating to the boundaries of a field to be worked; and
   ii) coordinates relating to the boundaries of distinct areas of weed being located within the boundary of the field of crops;
a capacity parameter unit configured for receiving one or more capacity parameters relating to the working vehicle;
a trajectory calculating unit configured for calculating an optimized trajectory to be followed by the work vehicle upon weeding the distinct areas of weed; wherein the optimized trajectory is being calculated on the basis of the coordinates received by the mapping unit; and one or more of the one or more capacity parameters received by the capacity parameter unit.

The support system is designed with the view to aid in optimizing finding a trajectory to be followed upon weeding distinct areas within an agricultural field with a working vehicle or implement.

The support system may be in the form of electronic equipment configured for receiving inputs relating to coordinates of the field, the distinct areas of the weed and optionally also of obstacles located therein. The support system is further configured to using these inputted inputs to determine an optimized trajectory to be followed. The support system typically makes use of a computer for performing calculations, such as iterative calculations.

The various units may independently be connected to each other, or at least be able to communicate with each other. The support system may comprise separate entities or be integrated.

An optimized trajectory shall be understood to mean that trajectory that, compared to other trajectories under investigation, is most efficient in terms of a cost parameter. An optimized trajectory may or may not be a globally optimized trajectory. In some instances an optimized trajectory merely expresses an intelligent and qualified suggestion for a best path to follow when weeding a crop field comprising distinct areas of weed.

In one embodiment of the support system of the present disclosure, the mapping unit furthermore is configured for receiving:
   iii) coordinates relating to the possible entrance/exit gates of the field; and/or
   iv) coordinates relating to the boundaries of one or more obstacles to be avoided by the work vehicle; wherein the one or more obstacles being located within the field.

This ensures that the position or positions of entrance/exit gates and possible obstacles are taking into consideration when calculating the optimized trajectory to be followed.

In one embodiment of the support system of the present disclosure, the optimized trajectory is an optimized trajectory in terms of total operational time for working the field; total productive time for working the field; total fuel consumption for working the field; total non-working distance for working the field; total distance travelled twice or more; total distance travelled through areas of non-weed crops; total area covered twice more.

Depending on which concern after which the trajectory is to be optimized, a number of different optimizations parameters are possible. Above, a few of these are listed.

In one embodiment of the support system of the present disclosure, the one or more capacity parameters being selected from the group comprises: effective working width of the work vehicle or the working implement, load of work vehicle as a function of distance travelled, fuel consumption as a function of distance travelled, minimum turning radius of vehicle or implement, or both.

These parameters are parameters that may be relevant in finding an optimized trajectory to follow when weeding a field.

In one embodiment of the support system of the present disclosure, the system further comprises a display unit configured to be able to show on a map of the field, the optimized trajectory to be followed by the work vehicle as calculated by the trajectory calculating unit.

This will enable the driver of the working vehicle or implement to easily follow the optimized trajectory, once this has been provided by the trajectory calculating unit.

In one embodiment of the support system of the present disclosure, the mapping unit is being configured for storing, in respect of one or more specific fields, one or more of: i) coordinates relating to the boundaries of the one or more specific fields; ii) coordinates relating to the possible entrance/exit gates of the one or more specific fields, iii) coordinates relating to boundaries of obstacles being present on the field; iv) coordinates relating to areas of previous year's or previous years' weed infestations.

This will allow minimizing the amount of input needed from time to time.

In one embodiment of the support system of the present disclosure, the trajectory calculating unit is configured to calculate an optimized trajectory analytically or numerically.

Analytically or numerically calculation strategies are two strategies that are particularly well suited in respect of the present disclosure.

In one embodiment of the support system of the present disclosure, the trajectory calculating unit is being configured to find a number of candidate trajectories, and wherein the trajectory calculating unit is configured to calculate, in respect of each candidate trajectory, an efficiency parameter, and wherein the trajectory calculating unit is configured to suggest to the user, that specific candidate trajectory that exhibits the highest efficiency parameter.

Such a mode of operation of the support system is particularly preferred.

In one embodiment of the support system of the present disclosure, the trajectory calculating unit is being configured to perform the following steps:
 a) approximating the coordinates relating to the boundaries of the field to be worked to a boundary polygon; and wherein the support system is being configured to determine the trajectory to be followed, based on that approximation;
 b) approximating the coordinates relating to the boundaries of each of the one or more obstacles, if any, to respective obstacle polygons; and wherein the support system is being configured to determine the trajectory to be followed, based on that approximation;
 c) defining one or more headlands located immediately within the boundary polygon;
 d) in respect of each obstacle polygon, if present, defining one or more headlands surrounding the obstacle polygon;
 e) defining a work area that corresponds to the area within the boundary polygon with the exclusion of the area corresponding to any headlands and with the exclusion of the area corresponding to any obstacle polygon;
 f) in respect of the orientation of one or more sides of headlands, define an array of parallel working rows located within the work area;
 g) define a number of weed rows, wherein a weed row is being either a headland comprising at least part of a distinct weed area, or being a working row comprising at least part of a distinct weed area.
 h) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths; wherein each possible continuous driving path comprises all weed rows;
 i) in respect of each of the possible continuous driving paths defined in step h), calculate an associated cost parameter, the calculated cost parameter being representative of the efficiency by following that specific continuous driving path;
 j) select as the trajectory to be followed, that specific continuous driving path exhibiting the highest efficiency.

Hereby it is possible in a clever and well-organized way to allow the trajectory calculating unit to find an optimized trajectory to be followed.

In one embodiment of the support system of the present disclosure, step f) is substituted with the following step:
 f') define an array of parallel working rows located within the work area, wherein the array of parallel working rows are already existing working rows that have been used in the field.

This allows using existing work rows, thereby avoiding creating additionally wheel tracks in the crop field.

In one embodiment of the support system of the present disclosure, the trajectory calculating unit is being configured to create a possible continuous path by first choosing a particular entrance/exit gate.

As the entrance/exit gate(s) is/are fixed constraint(s) it has proven beneficial to operate the system this way.

In one embodiment of the support system of the present disclosure, the headland surrounding the obstacle polygon, in respect of one or more of the obstacle polygons, if any obstacles are present, includes a safety offset area surrounding the obstacle polygon.

Including a safety offset area surrounding the obstacle polygon will enhance safety when operating the work vehicle or implement as collision hazards will be reduced this way.

In one embodiment of the support system of the present disclosure, each working row and/or each headland independently are having a width corresponding to the effective working width of the work vehicle or working implement.

It is beneficial to create working paths having widths corresponding to the effective working width of the work vehicle or working implement.

In one embodiment of the support system of the present disclosure, the support system being configured for defining a number of possible continuous driven paths, each comprising a sequence of straight line segments and arched line segments.

Hereby it will be possible for the driver of the work vehicle or implement to follow one continuous path.

In one embodiment of the support system of the present disclosure, the support system is being configured to find the optimized trajectory by means of a heuristic method, such as a greedy heuristic method, a tabu search solver, an ant colony solver, a genetic algorithm.

Such heuristic method will reduce the amount of data processing necessary for the trajectory calculating unit.

In one embodiment of the support system of the present disclosure, the support system is being configured to create a number N of possible continuous driven paths with an associated assigned cost parameter, and wherein the number N being an integer in the range 1,000-700,000 or more, for example, 2,000-600,000, such as 5,000-500,000, e.g., 10,000-400,000, such as 50,000-300,000 or 100,000-200,000 possible continuous driven paths with an associated assigned cost parameter.

Such numbers of choices to choose from will enhance the reliability of the trajectory found by the system.

In one embodiment of the support system of the present disclosure, the support system is being configured for automatically providing a signal for supplying to a weeding implement of the work vehicle, the signal being configured to activate/deactivate the weeding implement upon entering/exiting areas of weed to be weeded.

Hereby the manual operations to be performed by the driver will be eased.

In one embodiment of the support system of the present disclosure, the mapping unit, the capacity parameter unit and the trajectory calculating unit independently are integrated entities or are separate entities.

In a second aspect, the present disclosure relates to a method for determining a trajectory to be followed by an agricultural work vehicle, when weeding distinct areas of weed within a field of crops, the method comprising the steps:
  a) providing information relating to:
    i) coordinates relating to the boundaries of a field to be worked; and
    ii) coordinates relating to the boundaries of distinct areas of weed being located within the boundary of the field of crops;
  b) providing information relating to: one or more capacity parameters relating to the working vehicle;
  c) performing a calculation of an optimized trajectory to be followed by the work vehicle; wherein the optimized trajectory is being calculated on the basis of the coordinates provided in step a) and b).

In one embodiment of the second aspect of the present disclosure, step a) furthermore involves providing:
    iii) coordinates relating to the possible entrance/exit gates of the field; and/or
    iv) coordinates relating to the boundaries of one or more obstacles to be avoided by the work vehicle; wherein one or more obstacles are located within the field.

This ensures that the position or positions of entrance/exit gates and possible obstacles are taking into consideration when calculating the optimized trajectory to be followed.

In one embodiment of the second aspect of the present disclosure, the optimized trajectory is an optimized trajectory in terms of total operational time for working the field; total productive time for working the field; total fuel consumption for working the field; total non-working distance for working the field; total distance travelled twice or more; total distance travelled through areas of non-weed crops; total area covered twice or more.

Depending on which concern after which the trajectory is to be optimized, a number of different optimizations parameters are possible. Above, a few of these are listed.

In one embodiment of the second aspect of the present disclosure, one or more capacity parameters being selected from the group comprising: effective working width of the work vehicle or the working implement, load of work vehicle as a function of distance travelled, fuel consumption as a function of distance travelled, minimum turning radius of vehicle or implement or both.

These parameters are parameters that may be relevant in finding an optimized trajectory to follow when working a field.

In one embodiment of the second aspect of the present disclosure, the method involves presenting in a graphical presentation, such as being shown on an electronic map, the optimized trajectory to be followed by the work vehicle.

This will enable the driver of the working vehicle or implement to easily follow the optimized trajectory, once this has been provided by the trajectory calculating unit.

In one embodiment of the second aspect of the present disclosure, the method involves calculation of the optimized trajectory analytically or numerically.

Analytically or numerically calculation strategies are two strategies that are particularly well suited in respect of the present disclosure.

In one embodiment of the second aspect of the present disclosure, the method involves finding a number of candidate trajectories; calculation in respect of each candidate trajectory, an efficiency parameter; and suggesting to a user, that specific candidate trajectory that exhibits the highest efficiency parameter.

Such a mode of operation of the method is particularly preferred.

In one embodiment of the second aspect of the present disclosure, the method involves performing the following steps:
  a) approximating the coordinates relating to the boundaries of the field to be worked to a boundary polygon; and wherein the support system is being configured to determine the trajectory to be followed, based on that approximation;
  b) approximating the coordinates relating to the boundaries of each of the one or more obstacles, if any, to respective obstacle polygons; and wherein the support system is being configured to determine the trajectory to be followed, based on that approximation;
  c) defining one or more headlands located immediately within the boundary polygon;
  d) in respect of each obstacle polygon, if present, defining one or more headlands surrounding the obstacle polygon;
  e) defining a work area that corresponds to the area within the boundary polygon with the exclusion of the area corresponding to any headlands and with the exclusion of the area corresponding to any obstacle polygon;
  f) in respect of the orientation of one or more sides of headlands, define an array of parallel working rows located within the work area;
  g) define a number of weed rows, wherein a weed row is being either a headland comprising at least part of a distinct weed area, or being a working row comprising at least part of a distinct weed area.
  h) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths; wherein each possible continuous driving path comprises all weed rows;
  i) in respect of each of the possible continuous driving paths defined in step h), calculate an associated cost parameter, the calculated cost parameter being representative of the efficiency by following that specific continuous driving path;

j) select as the trajectory to be followed, that specific continuous driving path exhibiting the highest efficiency.

Hereby it is possible in a clever and well-organized way to allow the trajectory calculating unit to find an optimized trajectory to be followed.

In one embodiment of the second aspect of the present disclosure, the method involves creation of a possible continuous path by first choosing a particular entrance/exit gate.

As the entrance/exit gate(s) is/are fixed constraint it has proven beneficial to operate the method this way.

In one embodiment of the second aspect of the present disclosure, the headland surrounding the obstacle polygons, includes a safety offset area surrounding the obstacle polygon.

Including a safety offset area surrounding the obstacle polygon will enhance safety when operating the work vehicle or implement as collision hazards will be reduced this way.

In one embodiment of the second aspect of the present disclosure, the working row and/or each headland independently are having a width corresponding to the effective working width of the work vehicle or working implement.

It is beneficial to create working paths having widths corresponding to the effective working width of the work vehicle or working implement.

In one embodiment of the second aspect of the present disclosure, the method involves defining a number of possible continuous driven paths, each comprising a sequence of straight line segments and arched line segments.

In one embodiment of the second aspect of the present disclosure, the method involves finding the optimized trajectory by means of a heuristic method, such as a greedy heuristic method, a tabu search solver, an ant colony solver, a genetic algorithm.

Such heuristic method will reduce the amount of data processing necessary involved in the method.

In one embodiment of the second aspect of the present disclosure, the method involves creating a number N of possible continuous driven paths with an associated assigned cost parameter, and wherein the number N being an integer in the range 1,000-700,000 or more, for example, 2,000-600,000, such as 5,000-500,000, e.g., 10,000-400,000, such as 50,000-300,000 or 100,000-200,000 possible continuous driven paths with an associated assigned cost parameter.

Such numbers of choices to choose from will enhance the reliability of the trajectory found in the method.

In one embodiment of the second aspect of the present disclosure, the method being performed by using a support system according to the first aspect of the present disclosure.

In one embodiment of the second aspect of the present disclosure, the method is followed by weeding the field or part of the field by using a weeding implement and by following the optimized trajectory.

In a third aspect, the present disclosure relates to a computer program product that, when loaded or operating on a computer, being adapted to perform the method according to the second aspect of the present disclosure.

In the present description and in the appended claims it shall be understood that a computer program product may be presented in the form of a piece of software that is storable or stored on a piece of hardware. Hereby, the computer program product may be embodied in one or more computer readable storage media as a computer readable program code embodied thereon.

Accordingly, the computer program product may be presented as a computer-readable storage medium having a computer program product embodied therein.

The computer program code is configured for carrying out the operations of the method according to the first aspect of the present disclosure and it may be written in any combination of one or more programming languages.

In a fourth aspect, the present disclosure relates to an agricultural work vehicle comprising a support system according to the first aspect of the present disclosure.

In a fifth aspect, the present disclosure relates to a use of a support system according to the first aspect of the present disclosure, or of a computer program product according to the third aspect of the present disclosure, or of an agricultural work vehicle according to the fourth aspect of the present disclosure.

In one embodiment of the fifth aspect of the present disclosure, the use being related to weeding crop fields comprising a number of distinct weed areas.

Now referring to the figures for the purpose of illustration of the present disclosure, FIG. 1 shows an overhead plan view of a field 500 to be weeded by an agricultural working vehicle or implement. The field comprises an entrance/exit gate 4 located at the field boundary 2. Within the field, a number of distinct areas 6 of weed are present along with an obstacle 8. Also illustrated in FIG. 1 is a working vehicle D in the form of a tractor towing an herbicide spreader.

It is easily acknowledged that the field 500 with its many distinct areas 6 of weed and its entrance/exit gate 4 illustrated in FIG. 1 allows for an almost indefinitely number of possible trajectories for weeding the distinct areas 6 in the whole field, and that the human brain is not in itself without any technological aid capable to immediately tell which working path or working trajectory will be most efficient when weeding each distinct area 6 of weed.

Figure 2:
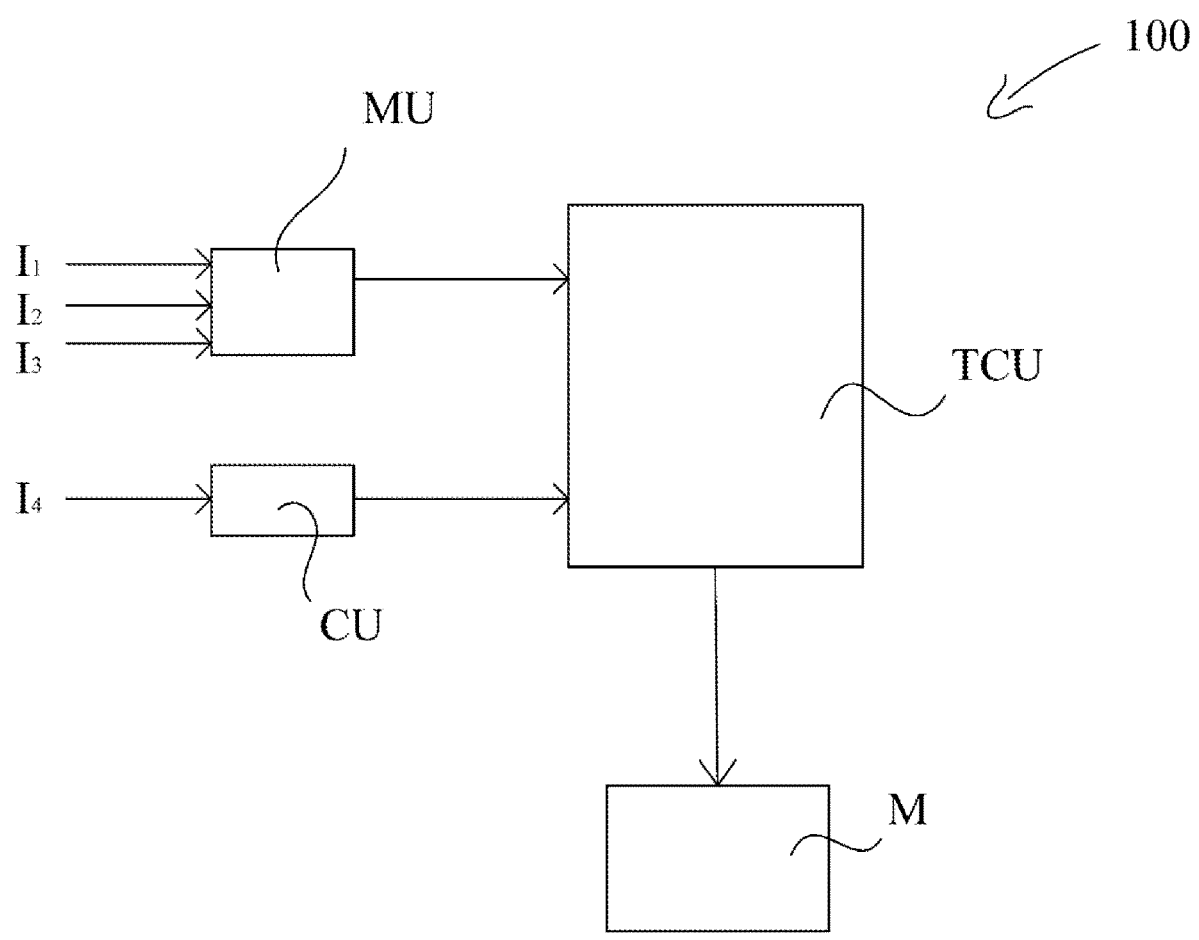
FIG. 2 is a diagrammatic illustration of the working mode of a support system according to the present disclosure.

FIG. 2 is a diagram that illustrates the working mode of one embodiment of the support system for determining a trajectory to be followed by an agricultural work vehicle with a weeding implement intended for weeding distinct areas of weed within a crop field, according to the first aspect of the present disclosure.

FIG. 2 shows the support system 100 for determining a trajectory to be followed by an agricultural work vehicle. The support system comprises a mapping unit MU configured for receiving information $I_1$ in the form of coordinates relating to the boundaries of a field to be worked; and information $I_2$ in the form of coordinates relating to the boundaries of one or more distinct areas of weed within the field; and information $I_3$ relating to the possible entrance(s)/exit(s) of a specific field to be worked.

The support system further comprises a capacity parameter unit CU configured for receiving information $I_4$ relating to one or more capacity parameters relating to the working vehicle.

The one or more capacity parameters may relate to effective working width of the work vehicle or the working implement, load of work vehicle as a function of distance travelled, fuel consumption as a function of distance travelled.

Based on the information $I_1$, $I_2$ and $I_3$ provided to the mapping unit MU and based on the information $I_4$ provided to the capacity parameter unit CU, a trajectory calculating unit TCU is calculating an optimized trajectory to be followed by the weeding implement. The calculated optimized work trajectory is displayed on the display M, which also outlines the field itself.

The calculation may be an analytical calculation or a numerical calculation.

EXAMPLES

The following examples illustrate a way of practicing the present disclosure in its various aspects.

Example 1

This example is intended for illustrating one way of mathematically processing a situation of having a boundary of a field having located therein a number of obstacles in order to create an array of possible working rows and headlands within that field that may be connected in various ways in order to create an array of possible continuous working paths to be followed.

In doing this, an efficiency parameter may be assigned and calculated in respect of possible continuous working path and the most efficient continuous working path can be selected among the array of possible continuous working paths.

The principle set out in this example relies on the following steps:
1. Define the boundary of the field.
2. Define the boundary of any obstacle.
3. Approximate the boundary of the field to a boundary polygon.
4. Optionally approximate the boundary of any obstacle to an obstacle polygon.
5. Define one or more headlands arranged immediately within the boundary polygon.
6. Define a headland surrounding any obstacle polygon.
7. Define a work area that comprises parts of the field that does not belong to a headland or an obstacle.
8. Within the work area, define different arrays of parallel working rows, wherein in respect of each array of parallel working rows, these working rows are being parallel to a side of one of the headlands.
9. In respect of each array of parallel working rows, connect in various ways working rows and headlands so as to create an array of possible continuous working paths.
10. Define a cost parameter and calculate in respect of all possible continuous working paths the total cost of following that specific continuous working path.
11. Present as the most optimum working path, that specific continuous working path exhibiting the lowest overall total cost.

This example can easily be adapted to the principle of the present disclosure.

Field Definition

Figure 3:
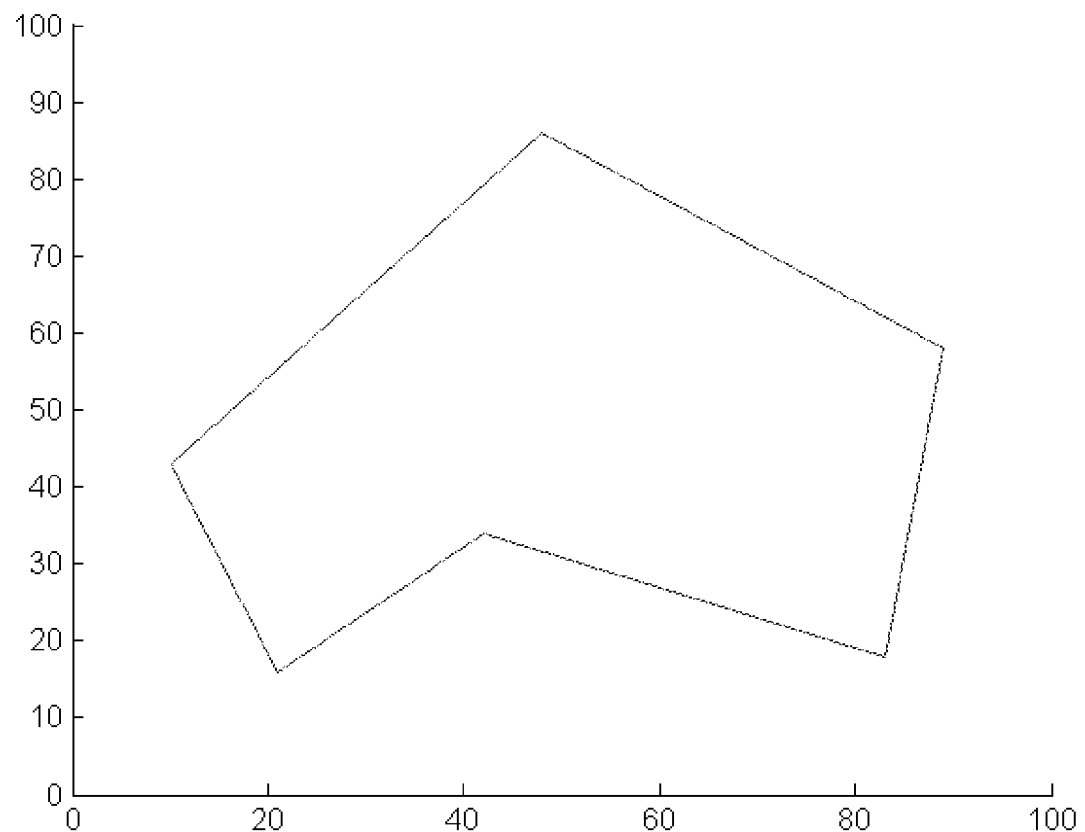
FIGS. 3-23d are illustrations relating to Example 1 and illustrate how to mathematically manage to create possible continuous driving paths in an agricultural field and how to find an optimum driving path amongst those possible continuous driving paths.

In the calculation of the present example, the following inputs are needed:
Defined Field Boundary
Defined Obstacle Boundary
Defined Field Gates
Vehicle working width
Vehicle turning radius
Specified number of headlands Processing Steps Field Definition The field is described by the field boundary, which is a polygon consisting of n points. In FIG. 3 the polygon P consists of 6 points ($P_1, \ldots, P_6$). The points of P are ordered such that they are in a clockwise orientation. P=([10,43], [48,86],[89,58],[83,18],[42,34],[21,16]). See FIG. 3.

Figure 4:
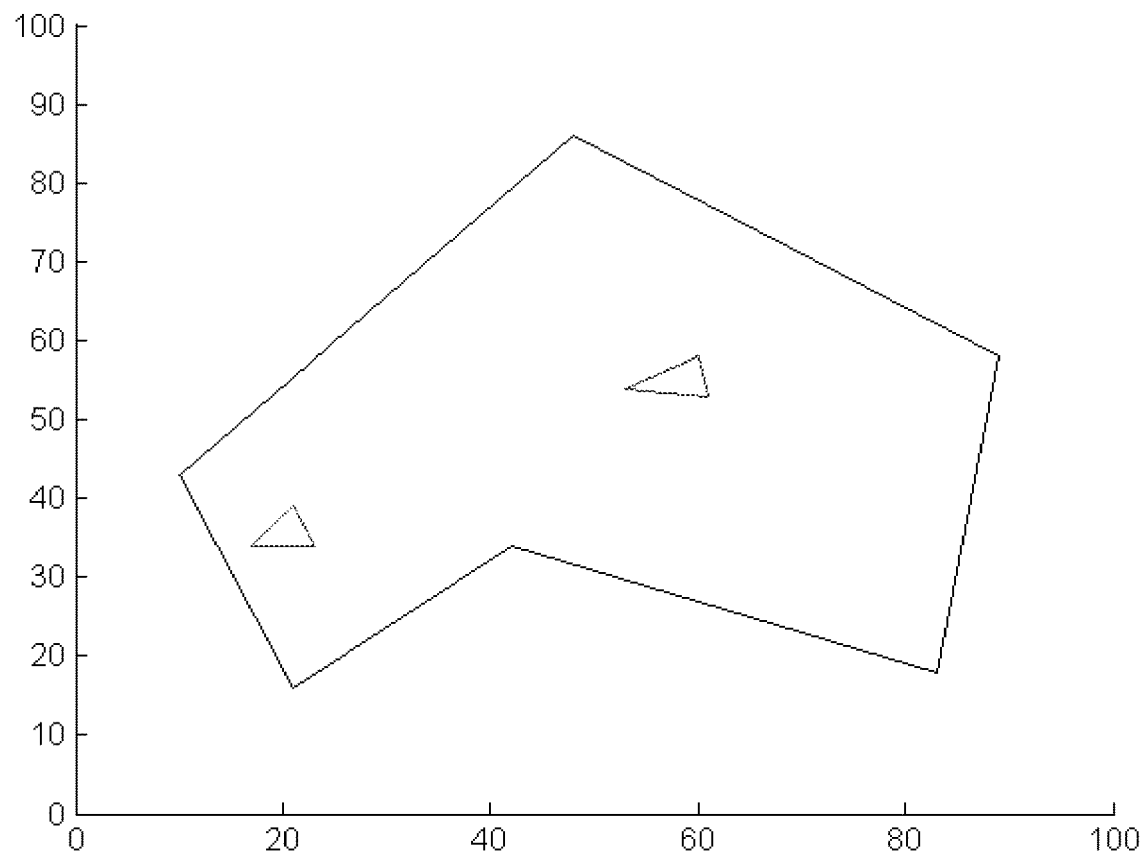

Within the boundary, there are a number of obstacles. The obstacles are described by a boundary. This may be the physical edge of the obstacle or it may also include a "safety offset" to ensure working vehicles remain a safe distance away. In FIG. 4 the obstacles are described as polygons ($O^1, O^2$) with points ($O^1_1, \ldots, O^1_3$) and ($O^2_1, \ldots, O^2_3$). The points of the obstacles are ordered such that they are in an anti-clockwise orientation. $O^1$=([23,34],[21,39],[17,34]), and $O^2$=([60,58],[53,54],[61,53]). See FIG. 4.

A number of gates are defined for the field. These are entry/exit point for the field and are located on the field boundary. In this example, there is one gate $G^1$=[83,18].

The working width is the effective working width of the agricultural machine or implement. The turning radius is minimum radius the vehicle can turn. For a standard two axle vehicle with one axle steering it can be calculated by dividing the distance between the front and rear axles of the vehicle by the tangent of the maximum angle of the steering axle.

Creating the Headlands

The headlands are areas that encompass the field boundary and the surround the obstacle. These areas are used by the vehicle to more easily maneuver in the field. The number of headlands required to safely operate in a field is the integer greater than 2*turning radius divided working width. The headlands have an outer boundary and an inner boundary. For the first headland areas the outer boundary is the boundary of the field or the obstacle and the inner boundary plotted such that the area between the outer boundary and inner boundary has a width equal to the working width. For subsequent headlands, the outer boundary is the inner boundary of the previous headland.

To calculate the headland areas the boundary of the field and the boundary of each obstacle are expressed as a set consisting of three arrays {P, V, A}, where P is the array of corner points of the boundary, V is the array of vertices linking the corners of the boundary and A is the array of vectors at the apex of each boundary point.

$$V_i = P_{i+1} - P_i : i = 1 \ldots p-1$$

$$V_p = P_1 - P_p$$

$$\frac{A_i \cdot -V_{i-1}}{|A_i||V_{i-1}|} = \cos\theta = \frac{A_i \cdot V_i}{|A_i||V_i|}, \frac{A_i \cdot [V_{i,y} \; -V_{i,x}]}{|A_i||V_i|} < \frac{A_i \cdot [-V_{i,y} \; V_{i,x}]}{|A_i||V_i|}$$

$$|A_i| = \frac{1}{\sin\theta}$$

Figure 5:
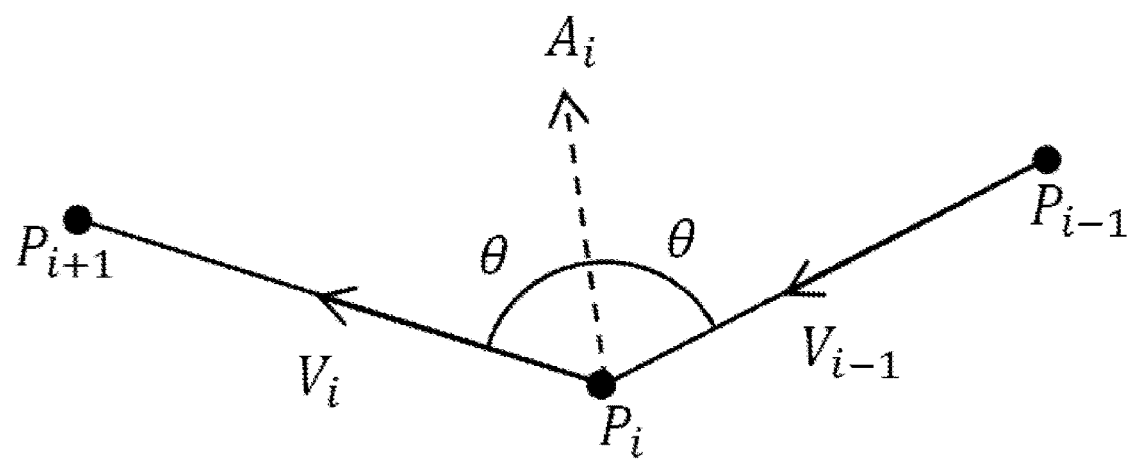

This is illustrated in FIG. 5.

The constrain on $A_i$ ensures that the $A_i$ vector always points to the right of the $V_i$ vector. See FIG. 5.

Figure 6:
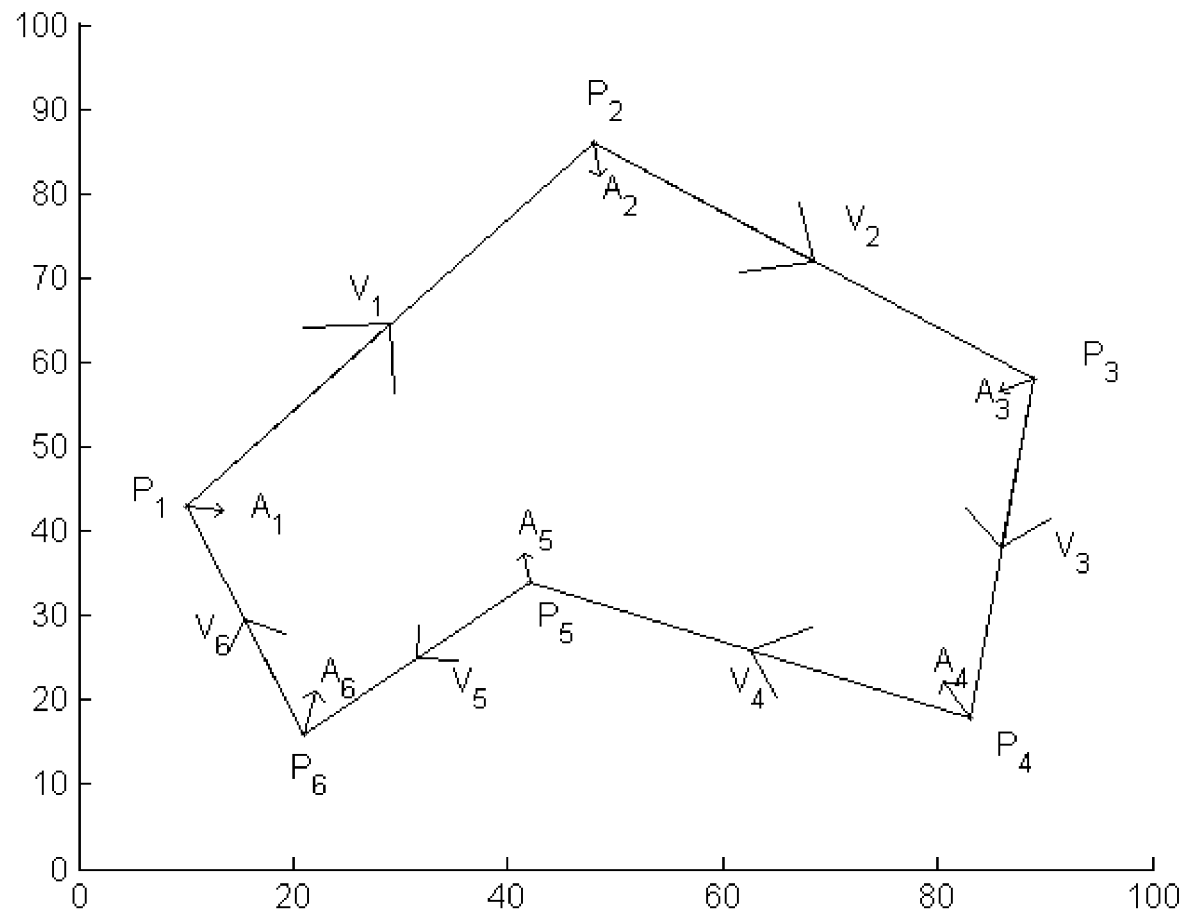

In FIG. 6, the P, V, and A arrays are labelled for the field boundary. In the example for the field boundary, V=([38, 43],[41,28],[−6,40],[−41,16],[−21,18],[−11,27]) and A=([1.16,0.20],[0.16,1.32],[−1.08,0.47],[−0.80,1.39],[−0.2, 1.15],[0.40,1.66]).

To create the inner boundary, the corners of the outer boundary are projected along the apex vector, so that they maintain an equal perpendicular distance from the two vectors creating the corner. Therefore, for a distance A, a new boundary can be created as a new set of point P'.

$$P_i' = P_i + \lambda * A_i : i=1, \ldots, p$$

V' and A' can then be created using the above equations.

There are three cases that must be monitored when creating the new boundary. The three cases are a self-corner interception, a self-edge interception and a two-polygon interception.

Case 1:

The self-corner interception occurs when two adjacent apex vectors intersect, resulting in V' to have a zero length and $P_i = P_{i+1}$. Therefore, for each P, there is a value $\alpha$ where this happens.

$$P'_i = P_i + \alpha_i * A_i = P_{i+1} + \alpha_i * A_{i+1} = P'_{i+1}: i = 1 \ldots p-1$$

$$P'_1 = P_1 + \alpha_p * A_1 = P_p + \alpha_p * A_p = P'_p$$

$$\alpha_i = \frac{P_{i+1} - P_i}{A_i - A_{i+1}}: i = 1 \ldots p-1$$

$$\alpha_p = \frac{P_1 - P_p}{A_p - A_1}$$

$$\alpha_n = \min\{\alpha_i\}: \alpha_i > 0, i = 1 \ldots p$$

If a self-corner interception occurs $P'_i$ is removed from P', and V' and A' are recalculated.

For the example of the field boundary, $\alpha = [38.34, 36.76, 40.9, 36.89, 160.54, 14.89]$. Therefore, $\alpha_n = 14.89$. Since O1 and O2 are both triangles with the points arranged in an anti-clockwise orientation, it is impossible for a self-corner interception to occur.

Case 2:

The self-edge interception occurs when an apex vector intersects a vertex between two points.

$$P_i' = P_j' + b * V_j': i, j = 1, \ldots, p; i \neq j, 0 < b < 1$$

Therefore, for each pair of point $P_i$ and $P_j$, there is a value $\beta_{ij}$ where this occurs.

$$\beta_{ij} = \frac{P_{j+1} - P_j - P_i}{A_i + A_j - A_{j+1}}: i = 1 \ldots p, j = 1 \ldots p-1, i \neq j, i \neq j+1$$

$$\beta_{ip} = \frac{P_1 - P_p - P_i}{A_i + A_p - A_1}: i = 1 \ldots p-1$$

$$\beta_{nm} = \min\{\min\{\beta_{ij}\}_j\}_i: i = 1 \ldots p, j = 1 \ldots p, \beta_{ij} > 0$$

If a self-edge interaction occurs, then P' is split into two subsets, $^1P'$ and $^2P'$ and V' and A' are recalculated.

$$P_i' = P_i + \beta_{nm} * A_i: i = 1 \ldots p$$

$$^1P' \{P'_1, \ldots, P'_n, P'_{m+1}, \ldots, P'_p\}, ^2P' = \{P'_n, \ldots, P'_m\} \text{ if } n < m$$

$$^1P' = \{P'_1, \ldots, P'_m, P'_n, \ldots, P'_p\}, ^2P' = \{P'_{m+1}, \ldots, P'_n\} \text{ if } n > m$$

For the example field, $\beta_{ij}$ is described in Table 1 below.

TABLE 1

| | i | | | | | |
|---|---|---|---|---|---|---|
| j | 1 | 2 | 3 | 4 | 5 | 6 |
| 1 | — | 38.24 | 32.79 | −4.22 | 16.76 | — |
| 2 | — | — | 29.96 | 23.26 | 19.23 | 38.18 |
| 3 | 23.21 | — | — | 41.13 | 39.04 | 43.31 |
| 4 | 28.25 | 21.46 | — | — | 46.61 | 47.95 |
| 5 | 18.55 | 22.46 | 36.84 | — | — | 69.48 |
| 6 | 14.50 | 28.13 | 47.40 | 35.48 | — | — |

Therefore, $\beta_{nm} = 14.50$, n=1, m=6. Again, since O1 and O2 are both triangles and, therefore, only have three points, it is impossible for a self-edge interception to occur.

Case 3:

The two-polygon interception occurs when two polygon sets, such as a field boundary and an obstacle boundary, intercept. Please note: if two polygons are created due to case 2, it is impossible that these two polygons can intercept.

$$^{gh}\gamma_{ij} = \frac{^hP_j - {^hP_{j+1}} - {^gP_i}}{^gA_i + {^hA_j} - {^hA_{j+1}}}: i = 1 \ldots {^gp},$$

$$j = 1 \ldots {^hp} - 1, g, h = 1, \ldots N, g \neq h$$

where N is the number of active sets describing polygons.

$$^{kl}\gamma_{nm} = \min\{\min\{\min\{^{gh}\gamma_{ij}\}_j\}_i\}_h\}_g$$

If a two-polygon interception occurs, the two polygons become merged together to form a new polygon, with the original two polygons being removed.

$$^gP_i' = {^gP_i} + {^{kl}\gamma_{nm}} * {^gA_i}: i = 1 \ldots {^gp}, g = 1, \ldots N$$

$$P = \{^kP_1, \ldots, {^kP_n}, {^lP_{m+1}}, \ldots {^lP_{h_p}}, {^lP_1}, \ldots, {^lP_m}, \ldots, {^kP_n}, \ldots, {^kP_{g_p}}\}$$

For the example with the field boundary being $^1P$, and the obstacles $O_1$ and $O_2$ being $^2P$ and $^3P$, respectively, then $^{gh}\gamma_{ij}$ is described by Table 2.

TABLE 2

| | | g | | | | | | | | | | |
|---|---|---|---|---|---|---|---|---|---|---|---|---|
| | | 1 | | | | | | 2 | | | 3 | | |
| | | i | | | | | | | | | | | |
| h | j | 1 | 2 | 3 | 4 | 5 | 6 | 1 | 2 | 3 | 1 | 2 | 3 |
| 1 | 1 | | | | | | | 2219 | 5.46 | — | — | 17.13 | 525.1 |
| | 2 | | | | | | | 31.77 | — | 160 | 13.56 | 106.3 | — |
| | 3 | | | | | | | 32.19 | — | — | — | — | 13.20 |
| | 4 | | | | | | | 40.43 | 124.6 | — | 76.56 | 14.05 | — |
| | 5 | | | | | | | 23.38 | — | — | 125.2 | 10.02 | — |
| | 6 | | | | | | | — | — | 6.76 | 70.31 | 15.43 | — |

TABLE 2-continued

| | | g | | | | | | | | | | |
|---|---|---|---|---|---|---|---|---|---|---|---|---|
| | | 1 | | | | | | 2 | | | 3 | |
| | | i | | | | | | | | | | |
| h | j | 1 | 2 | 3 | 4 | 5 | 6 | 1 | 2 | 3 | 1 | 2 | 3 |
| 2 | 1 | — | — | — | — | 4.54 | — | | | | — | 123.4 | 162.5 |
| | 2 | 5.22 | — | — | — | — | — | | | | — | — | — |
| | 3 | — | — | — | — | — | 0.93 | | | | — | — | — |
| 3 | 1 | — | 6.09 | — | — | — | — | — | — | — | | | |
| | 2 | 8.56 | — | — | — | — | — | 8.58 | 15.10 | — | | | |
| | 3 | — | — | 11.17 | — | — | — | — | — | — | | | |

Therefore, $^{kl}\gamma_{nm}$=0.93, k=1, l=2, n=6, m=3.

To create the inner boundary of the headlands for a field boundary, with or without field objects, an iterative algorithm is used. The algorithm limits the accumulated distance moved to be no larger than the sort after working width.

Figure 7:
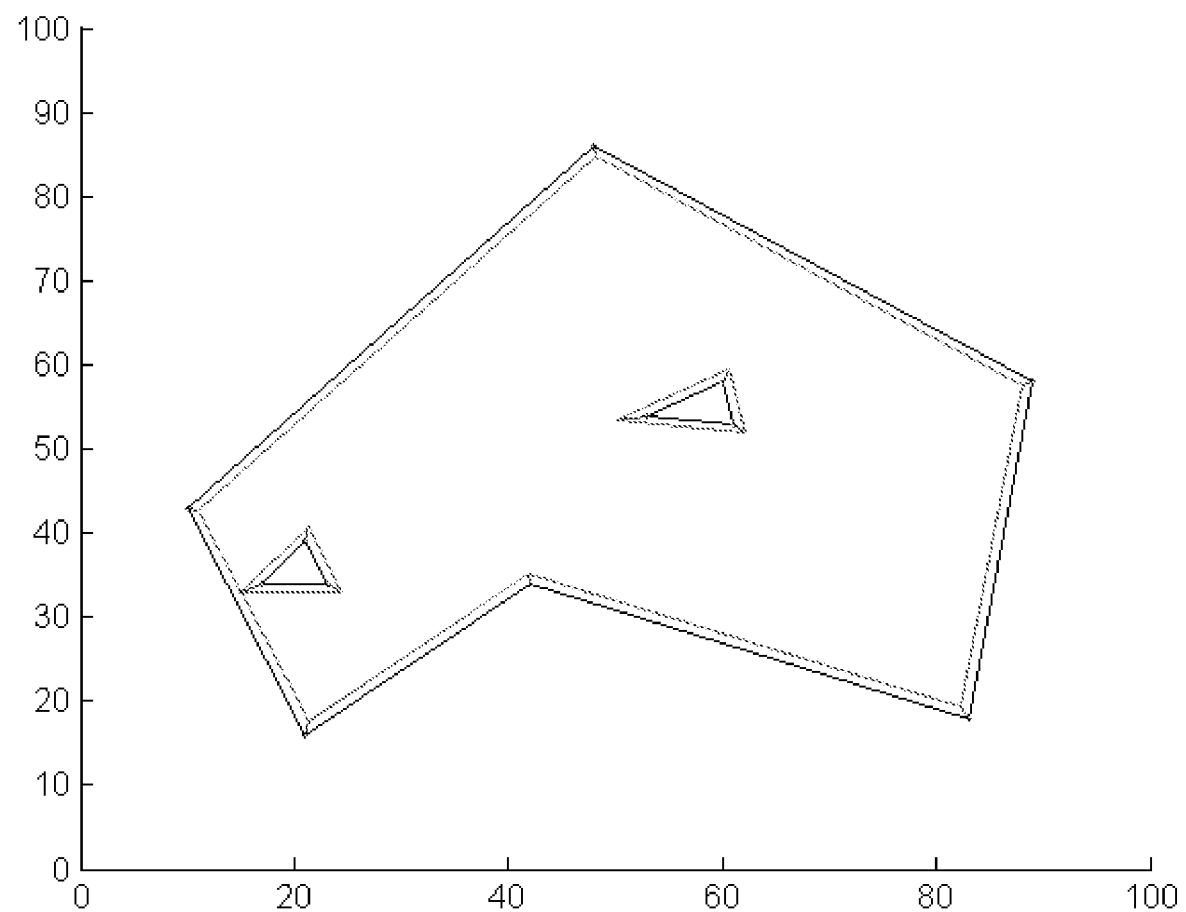

W=working width
While (W>0)
Calculate $\alpha_n$, $\beta_{ij}$, and $^{gh}\gamma_{ij}$, where appropriate
$\lambda=\min\{\alpha_n, \beta_{nm}, ^{kl}\gamma_{nm}, W\}$
Calculate P', V', A' using $\lambda$
W=W−$\lambda$
End while For example, if a working width of 3 is used, the iteration of the loop is, $\lambda=\min\{\alpha_n,\beta_{nm},^{kl}\gamma_{nm},W\}=\min\{14.89,14.50,0.93,3\}=0.93$ This means that the first interception to occur is the two-polygon interception between the field boundary and the first obstacle. The field boundary and the first obstacle then become merged together and the process continues. See FIG. 7.

At the next iteration of the loop, P is now ([24.38,33.07], [21.27,40.84],[15.06,33.07],[11.08,42.82],[48.15,84.76], [87.99,57.56],[82.25,19.30],[41.82,35.07],[21.38,17.55], [15.06,33.07]) and $O_2$ is now ([60.66,59.45],[50.10,53.42], [62.17,51.91]).

The new interceptions are as follows $\alpha$=[-,-,4.53,37.25,20.58,66.52,34.19,5.83,915.86].
Therefore, $\alpha_n$=4.53

$\beta_{ij}$

| | | i | | | | | | | | |
|---|---|---|---|---|---|---|---|---|---|---|
| j | 1 | 2 | 3 | 4 | 5 | 6 | 7 | 8 | 9 | 10 |
| 1 | — | — | — | — | — | — | — | 3.61 | — | — |
| 2 | — | — | — | 4.29 | — | — | — | — | — | — |
| 3 | — | — | — | — | — | — | — | — | — | — |
| 4 | 2219 | — | — | — | — | — | — | — | — | — |
| 5 | 30.84 | — | — | — | — | — | 22.36 | — | 37.25 | — |
| 6 | 31.27 | — | 35.22 | — | — | — | — | — | 35.22 | — |
| 7 | 39.51 | — | 46.73 | — | — | — | — | — | 46.73 | — |
| 8 | 22.45 | — | 34.19 | 14.76 | — | — | — | — | — | — |
| 9 | — | — | — | — | — | — | — | — | — | — |
| 10 | — | — | — | — | — | — | — | — | — | — |

$^{gh}\gamma_{ij}$

| | | g | | | | | | | | | | | |
|---|---|---|---|---|---|---|---|---|---|---|---|---|---|
| | | 1 | | | 2 | | | | | | | | |
| | | i | | | | | | | | | | | |
| h | j | 1 | 2 | 3 | 1 | 2 | 3 | 4 | 5 | 6 | 7 | 8 | 9 | 10 |
| 1 | 1 | | | | — | — | — | — | 5.16 | — | — | — | — |
| | 2 | | | | 7.65 | — | 9.78 | 7.63 | — | — | — | — | — |
| | 3 | | | | — | — | — | — | — | 10.24 | — | — | — |
| 2 | 1 | — | 122.50 | 161.5 | | | | | | | | | |
| | 2 | — | — | — | | | | | | | | | |
| | 3 | — | — | — | | | | | | | | | |
| | 4 | — | 16.20 | 524.2 | | | | | | | | | |
| | 5 | 12.63 | 105.3 | — | | | | | | | | | |
| | 6 | — | — | 12.27 | | | | | | | | | |
| | 7 | 75.63 | 13.12 | — | | | | | | | | | |
| | 8 | 124.2 | 9.09 | — | | | | | | | | | |
| | 9 | 69.38 | 14.51 | — | | | | | | | | | |
| | 10 | — | 127.7 | 190.2 | | | | | | | | | |

$$\lambda=\min\{\alpha_n,\beta_{nm},{}^{kl}\gamma_{nm},W\}=\min\{4.53,4.29,5.16, 2.07\}=2.07$$

Figure 8:
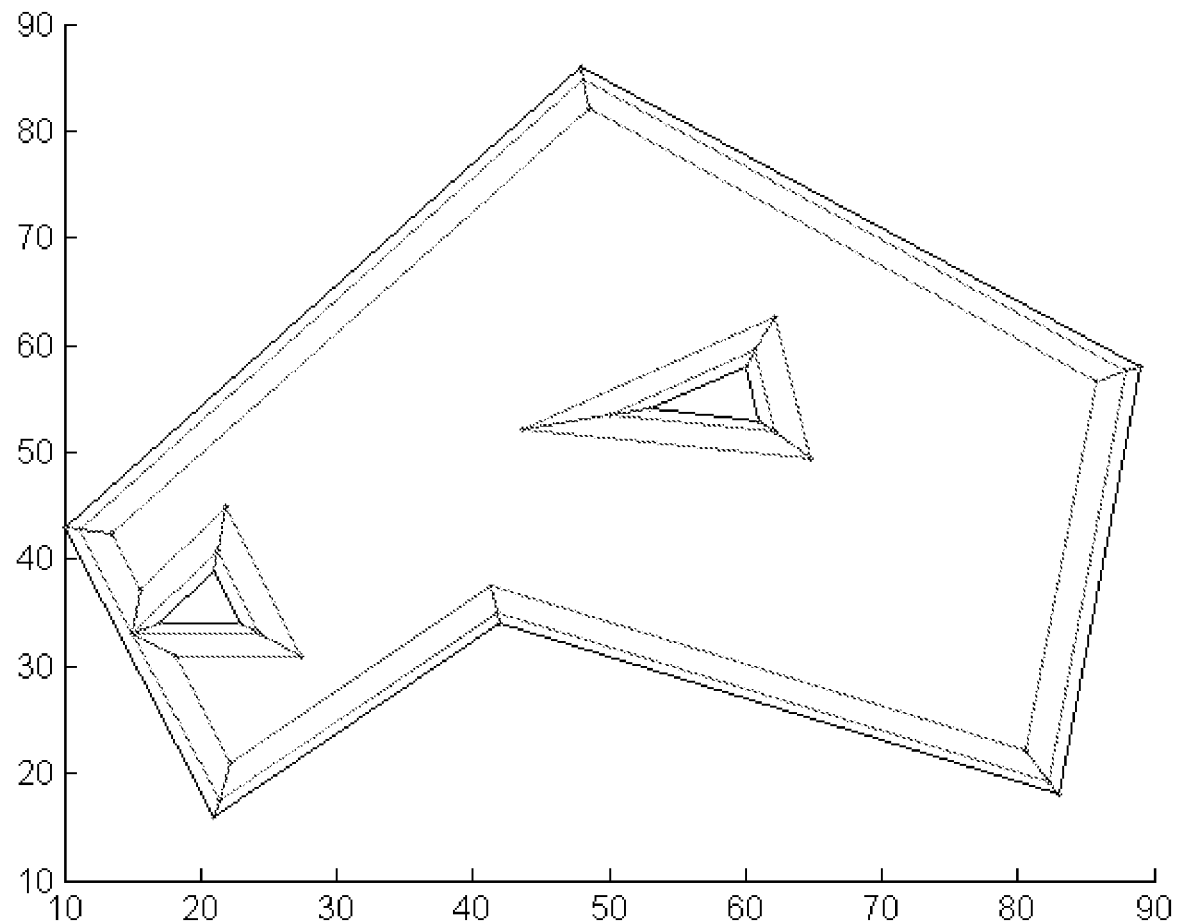

Since W is now smaller than the other parameters there is no need to do a third iteration, as W=0 in the next iteration. Therefore, the resultant polygons are {[27.43,31], [21.87, 44.89], [15.64,37.1], [13.48,42.41], [48.49,82.03], [85.75, 56.58], [80.59,22.16], [41.41,37.45], [22.21,20.99], [18.13, 31], [62.12,62.67], [43.70,52.14], [64.76,49.51]}, See FIG. 8.

If multiple headland passes are required then the resultant polygons are used as the outer boundaries of the next set of headlands. This method will be known as movePolygonSet and it will need a set of polygons and a distance to generate a new set of polygons, such that:

$$\text{movePolygonSet}(\{{}^1P,\ldots,{}^NP\},W) \Rightarrow \{{}^1P',\ldots,{}^MP'\}$$

It should be noted that in case any obstacle is not from the outset defined by a boundary being a polygon, that obstacle is approximated to an obstacle polygon and the headland around that obstacle is defined relative to that obstacle polygon.

Working Rows

After all of the headlands have been calculated the area remaining inside of the field boundary and outside of any remaining obstacles is considered the working area. See FIG. 9.

For example, one of the obstacles became integrated with the headland while the other remained separate. The outer boundary of the working area is P={[27.43,31],[21.87, 44.89],[15.64,37.1],[13.48,42.41],[48.49,82.03],[85.75, 56.58],[80.59,22.16],[41.41,37.45],[22.21,20.99],[18.13, 31]} and the hole created by the remaining obstacle is $H^1$={[62.12,62.67],[43.70,52.14],[64.76,49.51] }

The working rows are plotted as parallel rectangles across the working area, which have a width equal to the working width of the vehicle. The working rows are parallel to the driving direction of the field. Theoretically this could be any direction, which would give an infinite set of possible directions. However, to simplify the calculation, a limited set of directions parallel to all the edges of the remaining work area (both from the inside and outside) is used.

For example, the set of possible driving directions D= {[−0.38,0.93], [−0.62, 0.78], [−0.37,0.93], [0.66,0.75], [0.83,0.56], [−0.15,0.99], [−0.93,0.36], [−0.76,0.65], [−0.38, 0.93], [1,0], [−0.87,0.5], [0.99,0.12], [−0.2,0.98]}.

The working rows are calculated between two parallel lines, $L^i$ and $R^i$. These are the bounding left and right sides, respectively, of the working row. $L^i$ is defined as a straight line between the points $L_1^i$ and $L_2^i$, and $R^i$ is defined as a straight line between $R_1^i$ and $R_2^i$. The first left side $L^1$ starts at the furthest most left point of the boundary, with respect to the driving direction, and extends from the furthest most back point, $L_1^1$, to the furthest most forward point, $L_2^1$, with respect to the driving direction, of the boundary. The first right side $R^1$ is the transposition of $L^1$ a distance equal to the working width to the right, with respect to the driving direction.

$$\alpha_1 = \min\{DD \circ P_j\}_j$$

$$\alpha_2 = \max\{DD \circ P_j\}_j$$

$$\beta = \min\{DD^\perp \circ P_j\}_j$$

$$L_1^1 = \alpha_1 * DD + \beta * DD^\perp$$

-continued $$L_2^1 = \alpha_2 * DD + \beta * DD^\perp$$

$$R_1^1 = \alpha_1 * DD + (\beta + W) * DD^\perp$$

$$R_2^1 = \alpha_2 * DD + (\beta + W) * DD^\perp$$

$$L_1^i = \alpha_1 * DD + ((i-1) * W - \beta) * DD^\perp$$

$$L_2^i = \alpha_2 * DD + ((i-1) * W + \beta) * DD^\perp$$

$$R_1^i = \alpha_1 * DD + (\beta + i * W) * DD^\perp$$

$$R_2^i = \alpha_2 * DD + (\beta + i * W) * DD^\perp, 1 \leq i \leq \left\lceil \frac{\max\{DD^\perp \circ P_j\}_j}{W} \right\rceil$$

The maximum area of the each working row, MWR, is then defined as a polygon such that $MWR^i=[L_1^i,L_2^i,R_2^i,R_1^i]$. The area covered by each row, RCA, is then intersection between the maximum area of each working row, MWR, and the complement of any holes in the work area, H, and the outer boundary of the work area, P. If P is not convex and there are no holes in the work area then the intersection will result in only one polygon. However, if these conditions are not met, then it may be the case that the intersection produces more than one polygon.

$$(P/H) \cap MWR = RCA$$

For each resultant intersection the working row, WR, is then plotted as such:

$$\gamma_1 = \min\{DD \circ ({}^iRCA_j^k - L_1^i)\}_j$$

$$\gamma_2 = \max\{DD \circ ({}^iRCA_j^k - L_1^i)\}_j$$

$${}^iWR_1^k = L_1^i + \gamma_1 * DD$$

$${}^iWR_2^k = L_1^i + \gamma_2 * DD$$

$${}^iWR_3^k = L_1^i + \gamma_2 * DD + W * DD^\perp$$

$${}^iWR_4^k = L_1^i + \gamma_1 * DD + W * DD^\perp$$

Figure 10:
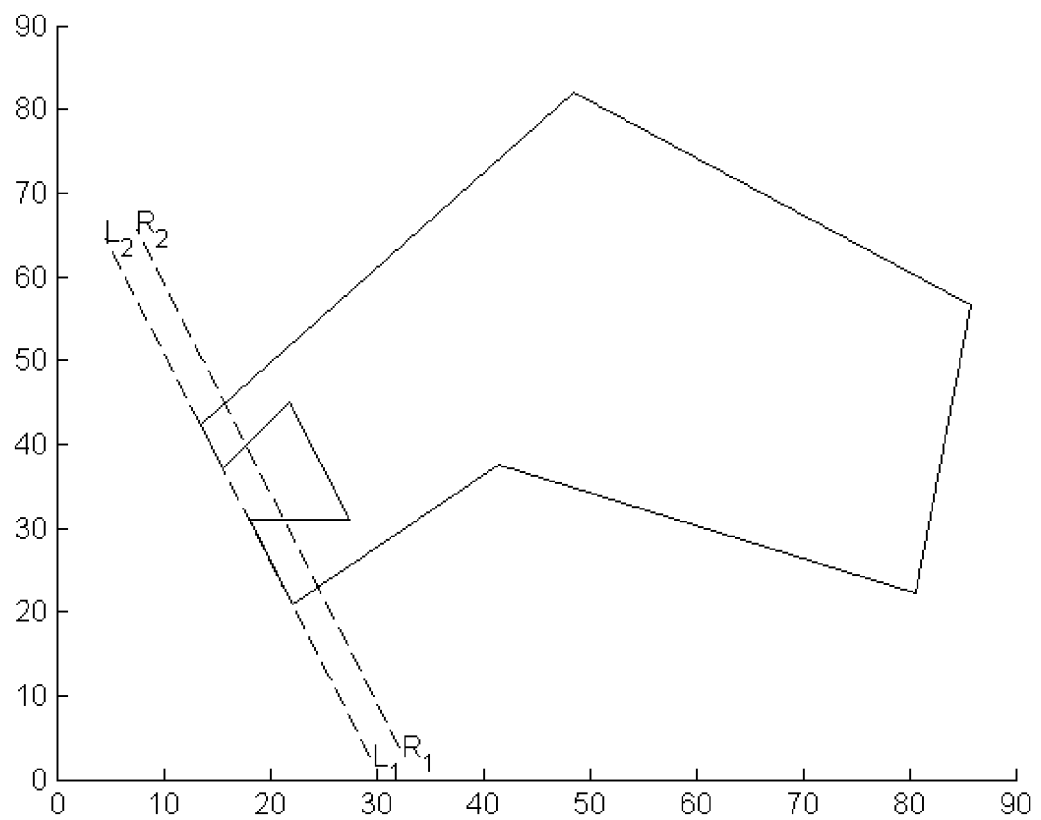

In the example, for the first driving direction, $DD=D_1=$ [−0.38, 0.93], therefore, $\alpha_1=-9.35$, $\alpha_2=58.15$, and $\beta=28.26$. The four points of $MWR^1$ are as follows, and shown in FIG. 10.

$$L_1^1 = 9.35*[-0.38,0.93]+28.26*[0.93,0.38]=[29.72, 1.81]$$

$$L_2^1 = 58.15*[-0.38,0.93]+28.26*[0.93,0.38]=[4.65, 64.49]$$

$$R_1^1 = 9.35*[-0.38,0.93]+(28.26+3)*[0.93,0.38]=[32.5, 2.93]$$

$$R_2^1 = 58.15*[-0.38,0.93]+(28.26+3)*[0.93,0.38]= [7.43,65.5]$$

Figure 11:
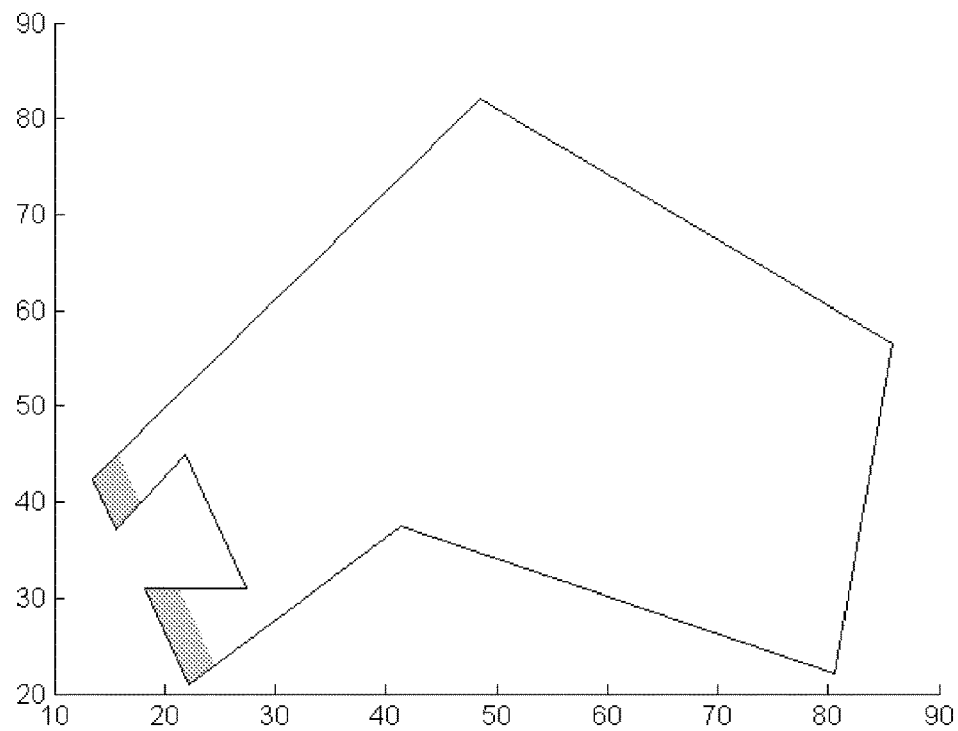

Therefore, $MWR^1$={[29.72, 1.81], [4.65,64.49], [7.43, 65.5], [32.5,2.93]}. The intersection results in two polygons, see FIG. 11, ${}^1RCA^1$={[17.77, 39.76], [15.64, 37.1], [13.48, 42.41], [15.71, 44.93]}, ${}^1RCA^2$={[24.49, 22.95], [22.21, 20.98], [18.13, 31], [21.27, 31]}.

Figure 12:
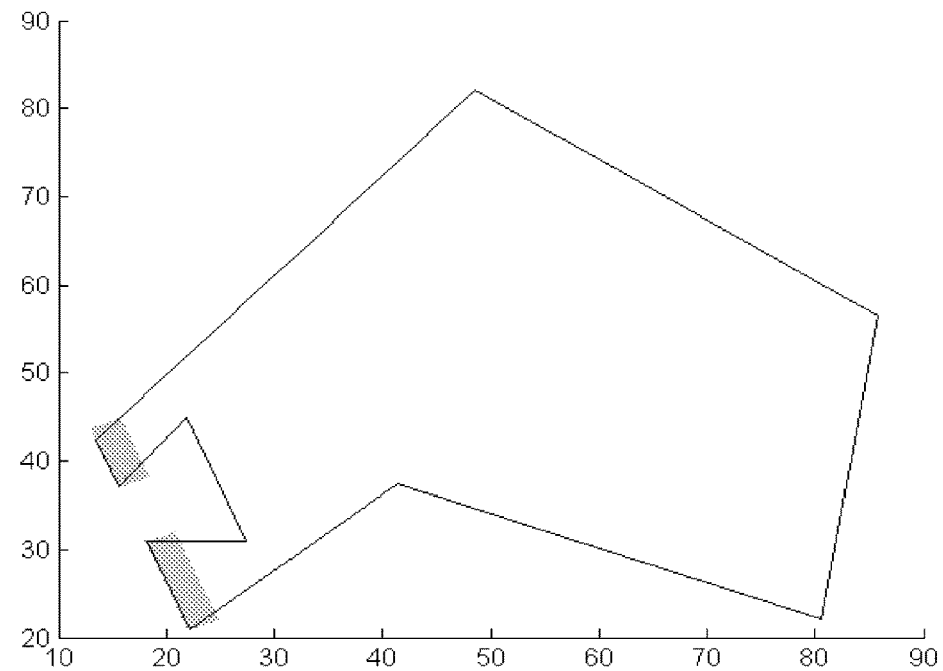

Finally, the two working rows are, ${}^1WR^1$={[15.61, 37.09], [12.92, 43.81], [15.7, 44.93], [18.39, 38.2]} and ${}^1WR^2$= {[22.07, 20.93], [18.06, 30.97], [20.84, 32.09], [24.86, 22.05]}, see FIG. 12.

Figure 13:
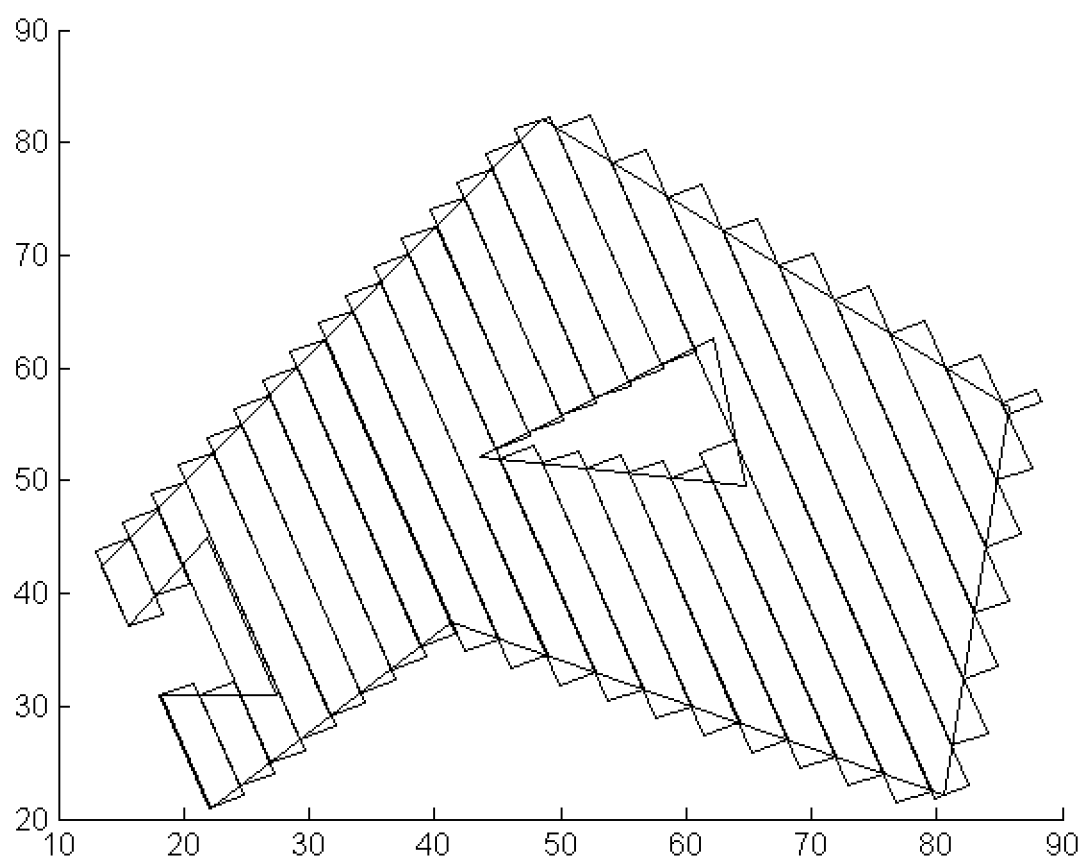

FIG. 13 shows all of the working rows generated across the field in respect of one possible orientation of working rows.

Creation of Possible Driving Paths

Figure 14:
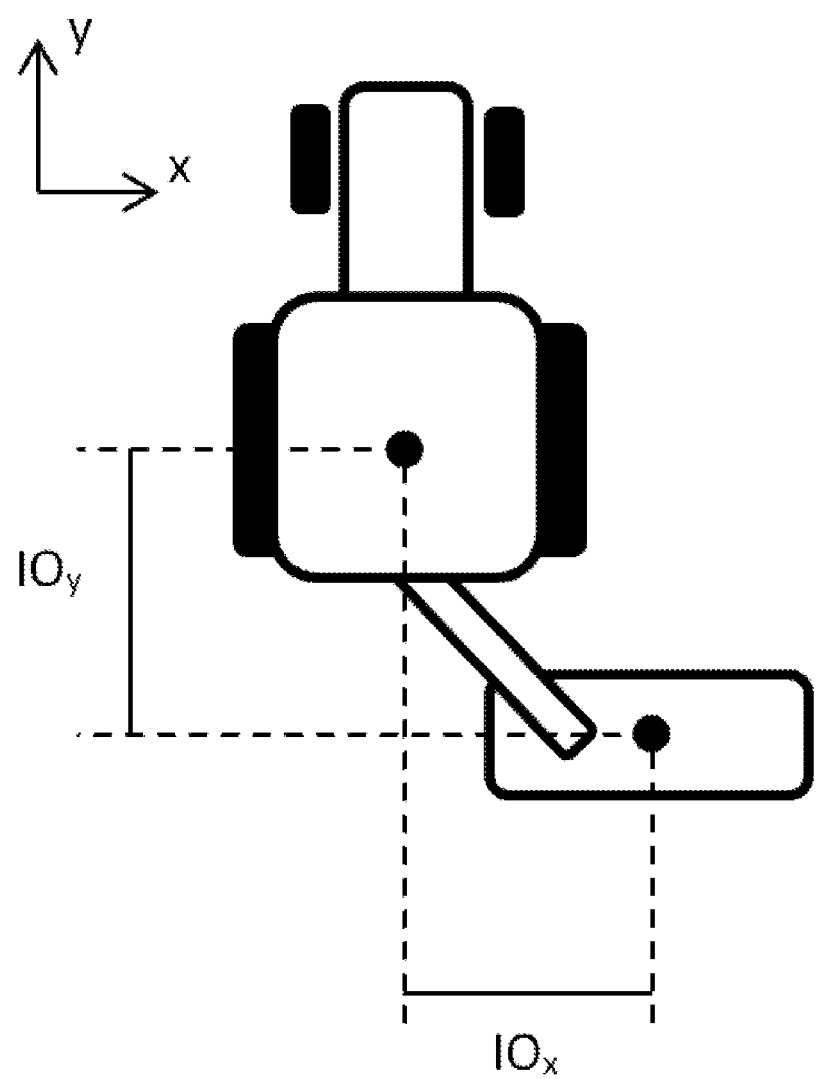

So that a vehicle can navigate the rows and the headlands, driven paths need to be generated for both the headlands and the working rows. The driven paths are plotted down the middle of the defined working rows and headlands. However, an offset, $IO=[IO_x, IO_y]$, can also be included between the vehicle center and the implement center in order for the implement center to maintain a central position on the working row (see FIG. 14).

For each working row WR there are two, $DR_+$ and $DR_-$, one in same direction as the driving direction and one in the opposite direction as the driving direction. Each DR starts at SDR and ends at EDR.

$$\theta = \left(\frac{DD_x}{|DD_x|}\right) * \cos^{-1}\left(\frac{DD_y}{|DD_y|}\right)$$

$$^iSDR_+^k = L_1^i + \gamma_1 * DD + 0.5 * W * DD^\perp - IO * \begin{bmatrix} \cos(\theta) & -\sin(\theta) \\ \sin(\theta) & \cos(\theta) \end{bmatrix}$$

$$^iEDR_+^k = L_1^i + \gamma_2 * DD + 0.5 * W * DD^\perp - IO * \begin{bmatrix} \cos(\theta) & -\sin(\theta) \\ \sin(\theta) & \cos(\theta) \end{bmatrix}$$

$$^iDR_+^k = [^iSDR_+^k, ^iEDR_+^k]$$

$$^iSDR_-^k = L_1^i + \gamma_2 * DD + 0.5 * W * DD^\perp - IO * \begin{bmatrix} \cos(\theta+\pi) & -\sin(\theta+\pi) \\ \sin(\theta+\pi) & \cos(\theta+\pi) \end{bmatrix}$$

$$^iEDR_-^k = L_1^i + \gamma_1 * DD + 0.5 * W * DD^\perp - IO * \begin{bmatrix} \cos(\theta+\pi) & -\sin(\theta+\pi) \\ \sin(\theta+\pi) & \cos(\theta+\pi) \end{bmatrix}$$

$$^iDR_-^k = [^iSDR_-^k, ^iEDR_-^k]$$

In the example, the vehicle has an offset $IO=[1, -1]$, and taking the example of the first WR, $^1WR^1$, the two DR can be found as:

$$\theta = \left(\frac{-0.38}{0.38}\right) * \cos^{-1}\left(\frac{0.93}{1}\right) = -0.376$$

$$^1SDR_+^1 = [29.72\ 1.81] + 37.99 * [-0.38\ 0.93] + 0.5 * 3 * [0.93\ 0.38] + [1\ -1] * \begin{bmatrix} 0.93 & 0.37 \\ -0.37 & 0.93 \end{bmatrix} = [15.70\ 38.21]$$

$$^1EDR_+^1 = [29.72\ 1.81] + 45.23 * [-0.38\ 0.93] + 0.5 * 3 * [0.93\ 0.38] + [1\ -1] * \begin{bmatrix} 0.93 & 0.37 \\ -0.37 & 0.93 \end{bmatrix} = [13.01\ 44.93]$$

$$^1SDR_-^1 = [29.72\ 1.81] + 45.23 * [-0.38\ 0.93] + 0.5 * 3 * [0.93\ 0.38] + [1\ -1] * \begin{bmatrix} -0.93 & -0.37 \\ 0.37 & -0.93 \end{bmatrix} = [15.61\ 43.81]$$

$$^1EDR_-^1 = [29.72\ 1.81] + 37.99 * [-0.38\ 0.93] + 0.5 * 3 * [0.93\ 0.38] + [1\ -1] * \begin{bmatrix} -0.93 & -0.37 \\ 0.37 & -0.93 \end{bmatrix} = [18.30\ 37.09]$$

Figure 15:
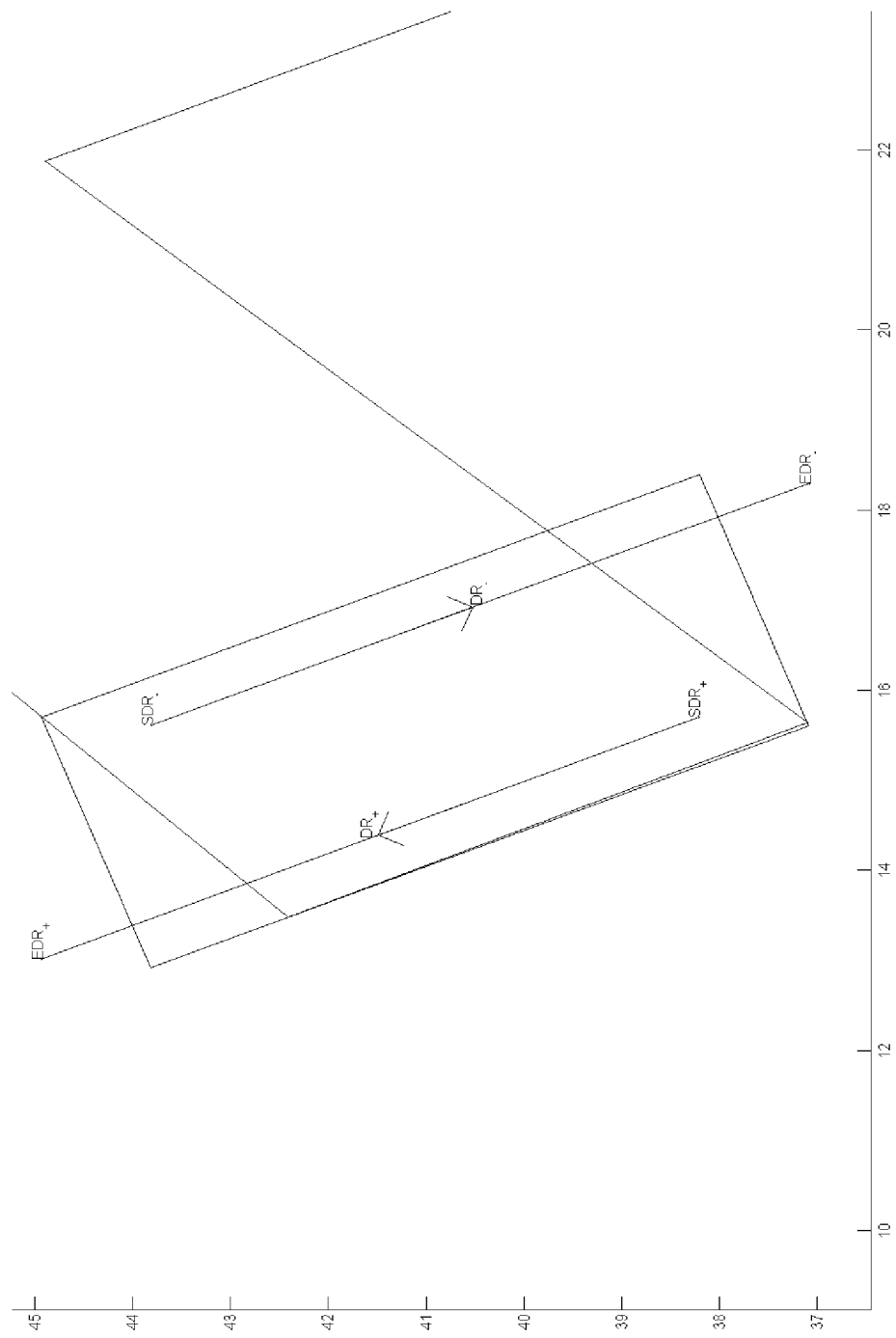

See FIG. 15.

Driven paths are also calculated for the headlands, each headland has two driven paths with one in a clockwise orientation and the other in an anti-clockwise orientation. The headland driven paths must also account for any implement offset are described above. The driven paths of the headlands are calculated using the center of each headland, which is in turn calculated from the inner boundaries. To find the center of a headland, the simplified version of the movePolygonSet method is used. If called movePolygonSetBack, the method requires a single polygon and a distance to move. As in the movePolygonSet method, the polygon P is defined as a number of points and V and A can be derived from P; however, the constraint placed on A is different such that $A_i$ is always to the left of $V_i$.

$$V_i = P_{i+1} - P_i; i = 1\ \ldots\ p-1$$

$$V_p = P_1 - P_p$$

$$\frac{A_i \cdot -V_{i-1}}{|A_i||V_{i-1}|} = \cos\theta = \frac{A_i \cdot V_i}{|A_i||V_i|},$$

$$\frac{A_i \cdot [V_{i,y}\ -V_{i,x}]}{|A_i||V_i|} > \frac{A_i \cdot [-V_{i,y}\ V_{i,x}]}{|A_i||V_i|}$$

$$|A_i| = \frac{1}{\sin\theta}$$

$$P_i' = P_i + \lambda * A_i; i = 1, \ldots, p$$

The iterative process it also simplified as there is only one polygon, such that:
While (W>0)
    Calculate $\alpha_n$, where appropriate
    $\lambda = \min\{\alpha_n, W\}$
    Calculate P', V', A' using $\lambda$
    $W = W - \lambda$
End while For the example of the first headland where P={[27.43, 31], [21.87,44.89], [15.64,37.1], [13.48,42.41], [48.49, 82.03], [85.75,56.58], [80.59,22.16], [41.41,37.45], [22.21, 20.99], [18.13,31]} and W=1.5, this creates $\alpha$=[-,-, 2.46, 35.17, 29.88, 18.52, 64.45, 32.12, 3.76, 913.79], and since $\lambda=\min\{\alpha_n, W\}$, therefore, $\lambda=1.5$ and resultant polygon is P={[25.22,32.5], [21.44,41.95], [15.22,3417], [11.74, 42.70], [48.24,84.01], [87.38,57.29], [81.79,20.08], [41.71, 35.72], [21.60,18.49], [15.90,32.50]}.

Since the headlands need two driven paths, one in each direction, these can be derived from $P^1$, the resultant of the movePolygonSetBack method, and $P^2$, which is the reversal $P^1$. The offset IO is again used to create the straight driven path, $SD^j$, for each direction around the headland. $SD^j$ has twice as many points as the polygon, $P^j$, it is derived from, such that:

$$P^j = \{P_1^j, \ldots, P_p^j\}, SD^j = \{SD_1^j, \ldots, SD_{2*p}^j\}$$

$$V_i = P_{i+1} - P_i: i = 1\ \ldots\ p-1$$

$$V_p = P_1 - P_p$$

$$\theta_i = \left(\frac{V_{i,x}}{|V_{i,x}|}\right) * \cos^{-1}\left(\frac{V_{i,y}}{\|V_{i,y}\|}\right)$$

$$SD_{2*i-1}^j = P_i^j - IO * \begin{bmatrix} \cos(\theta_i) & -\sin(\theta_i) \\ \sin(\theta_i) & \cos(\theta_i) \end{bmatrix}: i = 1, \ldots, p$$

$$SD_{2*i}^j = P_{i+1}^j - IO * \begin{bmatrix} \cos(\theta_i) & -\sin(\theta_i) \\ \sin(\theta_i) & \cos(\theta_i) \end{bmatrix}: i = 1, \ldots, p-1$$

$$SD_{2*p}^j = P_1^j - IO * \begin{bmatrix} \cos(\theta_p) & -\sin(\theta_p) \\ \sin(\theta_p) & \cos(\theta_p) \end{bmatrix}$$

For the example for $P^1$, $\theta$=[-0.38,2.47,0.39,0.72,2.17, 2.99,1.2,2.28, 0.39,1.57] and $SD^1$={[23.92,33.06], [20.14, 42.5], [21.59,40.54], [15.37,32.77], [13.91,34.72], [10.44, 43.25], [11.65,44.12], [48.16,85.43], [49.64,84.28], [88.77, 57.55], [88.22,56.15], [82.64,18.94], [80.5,19.51], [40.41, 35.16], [41.6,34.31], [21.5,17.08], [20.3,19.04], [14.59, 33.05], [16.9,33.5], [26.22,33.5]}.

A third method is now introduced called the movePolygonSetForward method. This is exactly the same as the movePolygonSetBack method taking in a polygon and a distance and returning another polygon, however, the constraint on A is such that $A_i$ is always to the right of $V_i$.

$$\frac{A_i \cdot -V_{i-1}}{|A_i||V_{i-1}|} = \cos\theta = \frac{A_i \cdot V_i}{|A_i||V_i|}, \frac{A_i \cdot [V_{i,y} \ -V_{i,x}]}{|A_i||V_i|} < \frac{A_i \cdot [-V_{i,y} \ V_{i,x}]}{|A_i||V_i|}$$

In order to make the straight driven line drivable by the vehicle, the vehicles minimum turning radius must be taken into account. Firstly the SD must be simplified to remove any corners too sharp for the vehicle. This is done by applying the movePolygonSetBack method and then the movePolygonSetForward method using the minimum turning radius (mtr) in succession until the methods create changes.

P=movePolygonSetBack(SD,mtr)
While (true)
    P'=movePolygonSetForward(P,2*mtr)
    P''=movePolygonSetBack(P',2*mtr)
    if (P==P'')
    then Break while
    else P=P'''
End while
$CS^1$=P
$CS^2$=movePolygonSetForward(P, 2*mtr)
$CS^3$=P'

For example, the vehicle's minimum turning radius (mtr) is 2 and, as previously stated, $SD^1$={[23.92,33.06], [20.14, 42.5], [21.59,40.54], [15.37,32.77], [13.91,34.72], [10.44, 43.25], [11.65,44.12], [48.16,85.43], [49.64,84.28], [88.77, 57.55], [88.22,56.15], [82.64,18.94], [80.5,19.51], [40.41, 35.16], [41.6,34.31], [21.5,17.08], [20.3,19.04], [14.59, 33.05], [16.9,33.5], [26.22,33.5]}. Using the movePolygonSetBack($SD^1$,2) generates P={[26.69,31.50], [21.72,43.91], [15.49,36.12], [12.88,42.53], [12.99,42.61], [48.41,82.69], [48.45,82.66], [86.32,56.80], [86.27,56.67], [80.99,21.46], [26.00,42.92], [38.35,34.16], [22.00,20.15], [17.38,31.50]} and then using movePolygonSetForward(P, 4), P'={[20.78,35.5], [20.56,36.05], [14.37,28.31], [7.99, 43.97], [10.31,45.61], [47.91,88.16], [50.82,85.89], [91.21, 58.31], [90.16,55.63], [84.2,15.92], [42.29,32.28], [20.4, 13.51], [11.44,35.5]}. Finally, using movePolygonSetBack (P',4) generates P''={[26.69,31.5], [21.73,43.91], [15.5, 36.13], [12.89,42.54], [13,42.62], [48.41,82.69], [48.46, 82.66], [86.32,56.8], [86.27,56.67], [80.99,21.47], [41.51, 36.87], [22.01,20.16], [17.38,31.5]}.

As can be seen, P'' is not the same as P so the loop must be restated with P=P''', d movePolygonSetForward(P'',4) generates P'={[20.78,35.5], [20.56,36.05], [14.37,28.31], [7.99,43.97], [10.31,45.61], [47.91,88.16], [50.82,85.89], [91.21,58.31], [90.16,55.63], [84.2,15.92], [42.29,32.28], [20.4,13.51], [11.44,35.5]} and movePolygonSetBack(P',4) generates P''={[26.69,31.5], [21.73,43.91], [15.5,36.13], [12.89,42.54], [13,42.62], [48.41,82.69], [48.46,82.66], [86.32,56.8], [86.27,56.67], [80.99,21.47], [41.51,36.87], [22.01,20.16], [17.38,31.5]}.

Now it can be seen that P''=P so the loop can be broken and $CS^1$={[26.69,31.5], [21.73,43.91], [15.5,36.13], [12.89, 42.54], [13,42.62], [48.41,82.69], [48.46,82.66], [86.32, 56.8], [86.27,56.67], [80.99,21.47], [41.51,36.87], [22.01, 20.16], [17.38,31.5]}, $CS^2$={[23.74,33.5], [21.15,39.98], [14.93,32.22], [10.44,43.25], [11.65,44.12], [48.16,85.43], [49.64,84.28], [88.77,57.55], [88.22,56.15], [82.6,18.69], [41.9,34.57], [21.2,16.83], [14.41,33.5]} and $CS^3$={[20.78, 35.5], [20.56,36.05], [14.37,28.31], [7.99,43.97], [10.31, 45.61], [47.91,88.16], [50.82,85.89], [91.21,58.31], [90.16, 55.63], [84.2,15.92], [42.29,32.28], [20.4,13.51], [11.44, 35.5]}.

The driven path of the headland is built as a sequence of straight lines and of arced lines. The straight lines are defined by a start point, $sp_i$, a start direction, $sd_i$, and a length, $l_i$, whereas the arced lines have a define center of rotation, $cr_i$. The center of rotation of the straight line can also be considered as infinitely far away from the start point in a direction perpendicular to the start direction.

Figure 16:
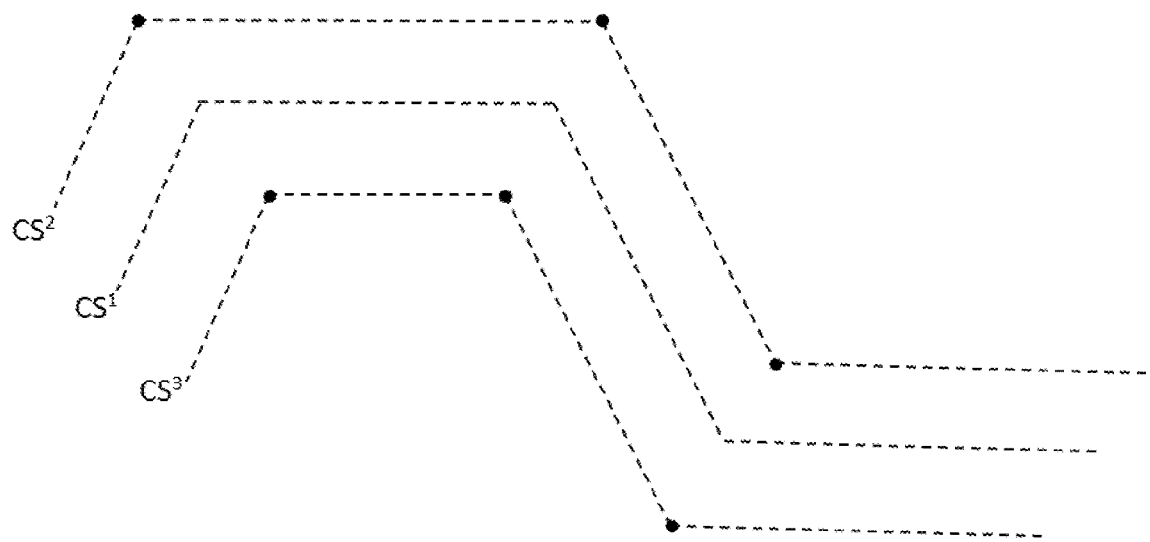

FIG. 16 shows an example of $CS^1$, $CS^2$, and $CS^3$ to define their relationship. The straight lines of the driven path are defined as parallel to the lines in $CS^1$. The corners of $CS^2$ and $CS^3$ are then used as the centers of the arced lines to link together the straight lines.

Figure 17:
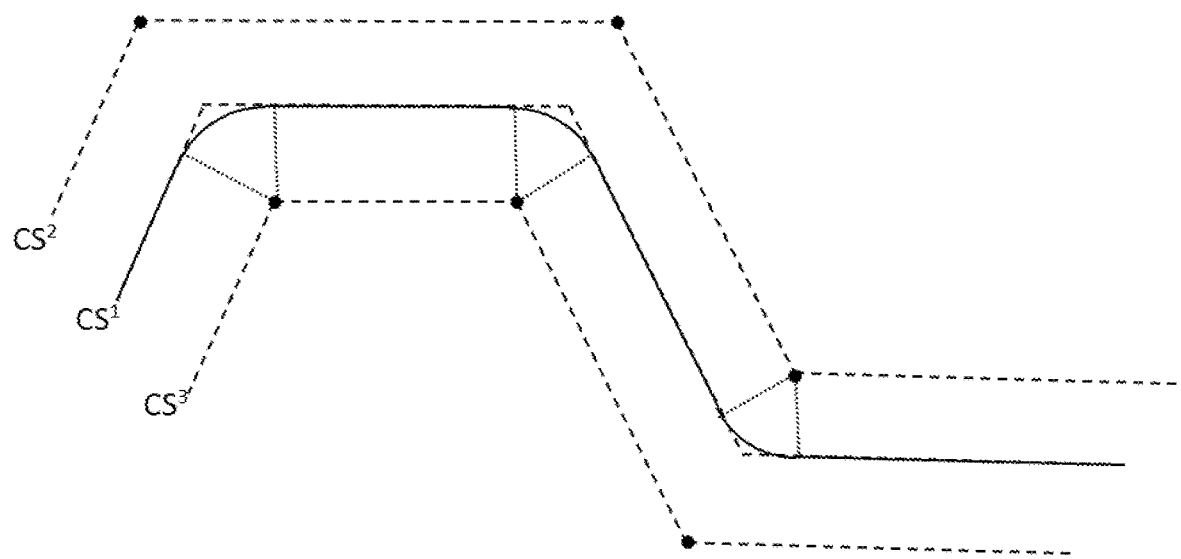

FIG. 17 shows an example of how the driven path is constructed.

Figure 18:
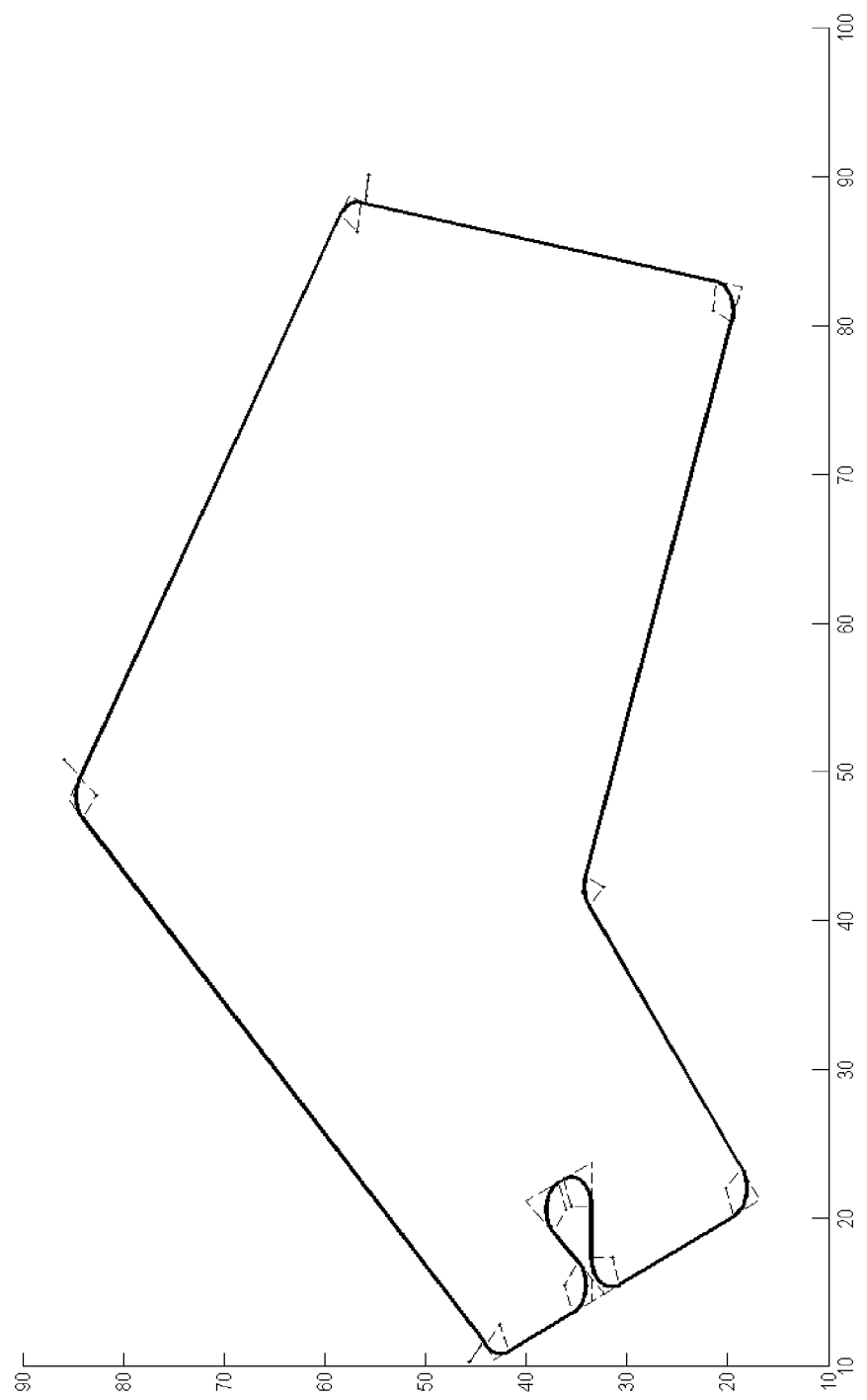

For example, fields $CS^1$, $CS^2$, and $CS^3$ have already been calculated; therefore, Table 3 below describes the sequence of straight lines and arced lines; the example of the driven path is shown in FIG. 18.

TABLE 3

| i | Start point ($sp_i$) | Start direction ($sd_i$) | Length ($l_i$) | Centre of Rotation ($cr_i$) |
|---|---|---|---|---|
| 1 | [22.64, 36.24] | [−0.37, 0.93] | 0.60 | ~ |
| 2 | [22.42, 36.80] | [−0.37, 0.93] | 4.17 | [20.56, 36.05] |
| 3 | [19.00, 37.30] | [−0.62, −0.78] | 3.11 | ~ |
| 4 | [17.06, 34.88] | [−0.62, −0.78] | 4.16 | [15.50, 36.13] |
| 5 | [13.65, 35.37] | [−0.38, 0.93] | 6.92 | ~ |
| 6 | [11.04, 41.78] | [−0.38, 0.93] | 2.36 | [12.89, 42.54] |
| 7 | [11.48, 43.96] | [0.71, 0.70] | 0.33 | ~ |
| 8 | [11.71, 44.19] | [0.71, 0.70] | 0.14 | [10.31, 45.61] |
| 9 | [11.81, 44.29] | [0.66, 0.75] | 53.02 | ~ |
| 10 | [46.92, 84.02] | [0.66, 0.75] | 2.95 | [48.41, 82.69] |
| 11 | [49.59, 84.31] | [0.81, −0.59] | 0.07 | ~ |
| 12 | [49.64, 84.27] | [0.81, −0.59] | 0.05 | [50.82, 85.89] |
| 13 | [49.69, 84.24] | [0.83, −0.56] | 45.73 | ~ |
| 14 | [87.45, 58.45] | [0.83, −0.56] | 2.38 | [86.32, 56.80] |
| 15 | [88.28, 56.37] | [−0.21, −0.98] | 0.32 | ~ |
| 16 | [88.21, 56.06] | [−0.21, −0.98] | 0.13 | [90.16, 55.63] |
| 17 | [88.18, 55.93] | [−0.15, −0.99] | 35.15 | ~ |
| 18 | [82.97, 21.17] | [−0.15, −0.99] | 3.59 | [80.99, 21.47] |
| 19 | [80.27, 19.60] | [−0.93, 0.36] | 39.98 | ~ |
| 20 | [43.02, 34.14] | [−0.93, 0.36] | 2.16 | [42.29, 32.28] |
| 21 | [40.99, 33.79] | [−0.76, −0.65] | 23.29 | ~ |
| 22 | [23.31, 18.64] | [−0.76, −0.65] | 3.79 | [22.01, 20.16] |
| 23 | [20.15, 19.40] | [−0.38, 0.93] | 12.25 | ~ |
| 24 | [15.53, 30.75] | [−0.38, 0.93] | 3.92 | [17.38, 31.50] |
| 25 | [17.38, 33.50] | [1.00, 0.00] | 3.40 | ~ |
| 26 | [20.78, 33.50] | [1.00, 0.00] | 3.90 | [20.78, 35.50] |

Joining Driving Paths

To be able to plot a continual path for a vehicle to negotiate all of the headlands and working rows, connections are needed between the separate entities. Connections are created from working row driven path ends (EDR) to the driven paths of the headlands, and from the driven paths to the headland to working row driven path starts (SDR).

There are three types of connections that are used to connect a point to a path, and each connection type depends on whether it is connecting to a part of the driven path that is either: a straight line, an arced line in the same direction as the turn from the point, or an arced line in the opposite direction to the turn from the point.

Figure 19:
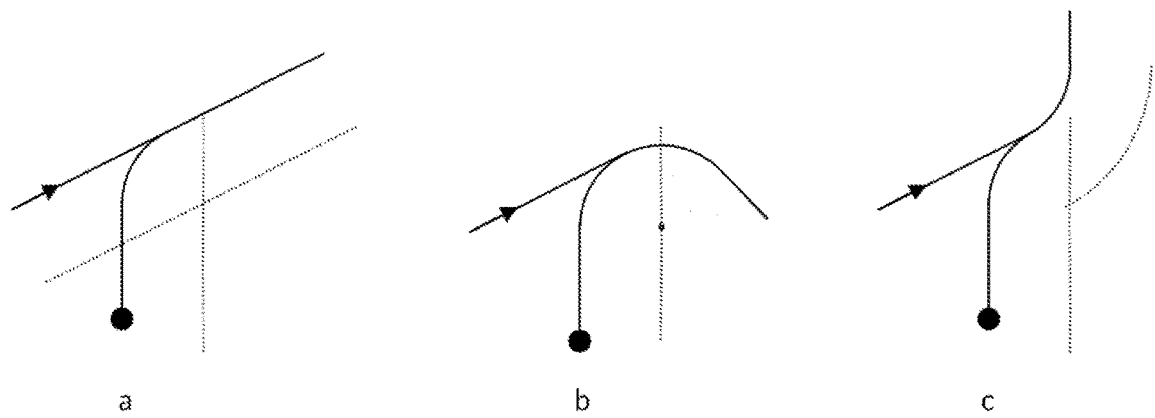

The first type of connection involves moving forward from the point in the specified direction and then making a single turn to join the other driven path, see FIG. 19.

To calculate the center of the single turn a line is plotted parallel to the specified direction at an offset of the turning radius perpendicular to the specified direction in the direction of the turn. The center of the single turn is defined as the intercept between this and a second line relating to the driven path. When joining the part of the path that is straight. In FIG. 19(a)) second line is plotted parallel to the driven path at an offset of the turning radius perpendicular to the driven path in the direction of the turn. When joining the part of the path that is an arced line in the same direction (FIG. 19(b)) the second line is in fact a point corresponding to the center of rotation of the arced line. When joining the part of the path that is an arced line in the opposite direction (FIG. 19(c)) the second line is an arced line with the same center as the driven path arced line, but with a radius that is twice as large.

Figure 20:
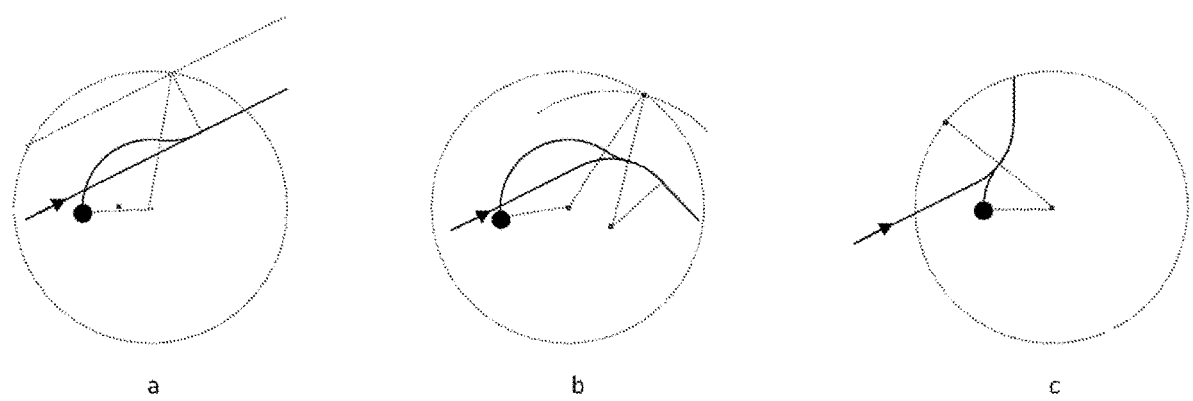

The second type of connection involves calculating two turns, in opposite directions, to join a point to the other driven path, see FIG. 20.

The center of the first is set at a distance of equal to the turning radius away from the point perpendicular to the specified direction in the direction of the first turn. The second turn is then in the opposite direction as the direction of the first turn and its center is calculated as the intercept of a circle with the same center as the first turn but twice the radius and a second line. When joining the part of the path that is straight FIG. 20(a)) the second line is a line plotted parallel to the driven path at an offset of the turning radius perpendicular to the driven path in the direction of the second turn. When joining the part of the path that is an arced line in the same direction as the first turn (FIG. 20(b)) the second line is an arced line with the same center as the driven path arced line, but with a radius that is twice as large. When joining the part of the path that is an arced line in the opposite direction as the first turn (FIG. 20(c)) the second line is in fact a point corresponding to the center of rotation of the arced line.

The third type of connection is very similar to the first type of connection; however, the first straight line is allowed to go in the opposite direction of the specified direction, i.e., the vehicle reverses.

The third type of connection is deprioritized, as reversing in the field can cause additional problems, such as taking more time or causing damage, therefore, if a type 1 connection or type 2 connection can be made between a working row driven path and a headland, then a type 3 connection is not attempted.

Figure 21:
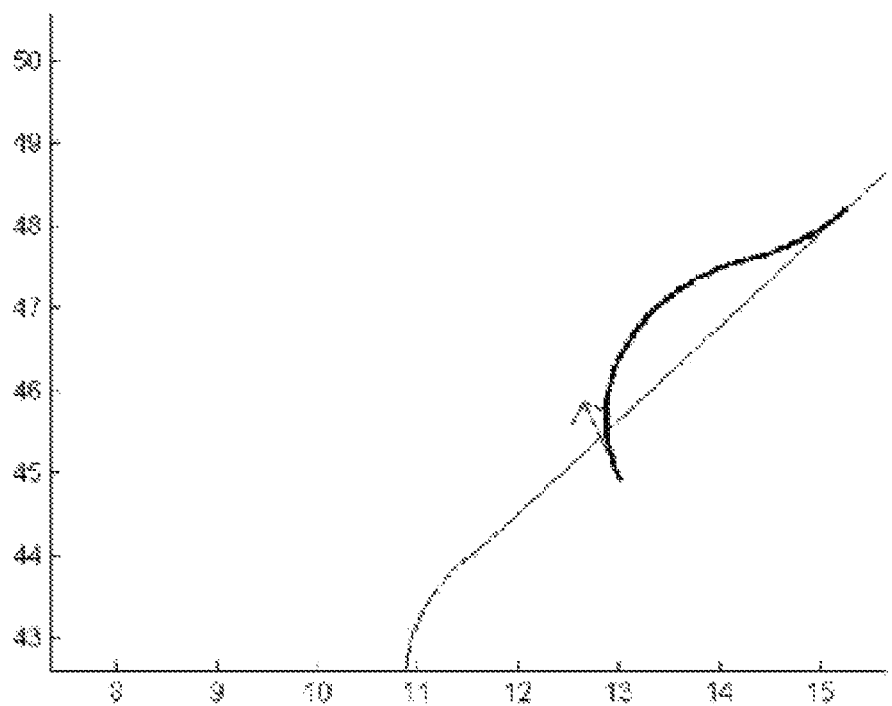

Described earlier, $^1EDR_+^1$=[13.01 44.93], is an exit from a working row driven path that needs to join a headland driven path. Using the headland driven path also described earlier it is possible to make three connections between the working row driven path and the headland driven path, see FIG. 21(a)-(c). FIG. 21(a) is a type 1 connection, while FIGS. 21(b) and 21(c) are type 2 connections.

The three paths are full described in the Table 4 below.

TABLE 4

| i | Start point ($sp_i$) | Start direction ($sd_i$) | Length ($l_i$) | Centre of Rotation ($cr_i$) |
|---|---|---|---|---|
| a | | | | |
| 1 | [13.01, 44.93] | [−0.37, 0.93] | 1.77 | ~ |
| 2 | [12.36, 46.57] | [−0.37, 0.93] | 10.36 | [10.50, 45.83] |

TABLE 4-continued

| i | Start point ($sp_i$) | Start direction ($sd_i$) | Length ($l_i$) | Centre of Rotation ($cr_i$) |
|---|---|---|---|---|
| b | | | | |
| 1 | [13.01, 44.93] | [−0.37, 0.93] | 1.08 | [14.87, 45.67] |
| 2 | [12.90, 45.99] | [0.16, 0.99] | 11.44 | [10.92, 46.31] |
| c | | | | |
| 1 | [13.01, 44.93] | [−0.37, 0.93] | 3.34 | [14.87, 45.67] |
| 2 | [14.31, 47.59] | [0.96, 0.28] | 1.02 | [13.76, 49.51] |

The connections from the headland driven paths to the working row driven paths starts are calculated in exactly the same way; however, the specified direction and the headland driven paths are first reversed, the connections are then calculated and finally the connections are reversed.

Figure 23A:
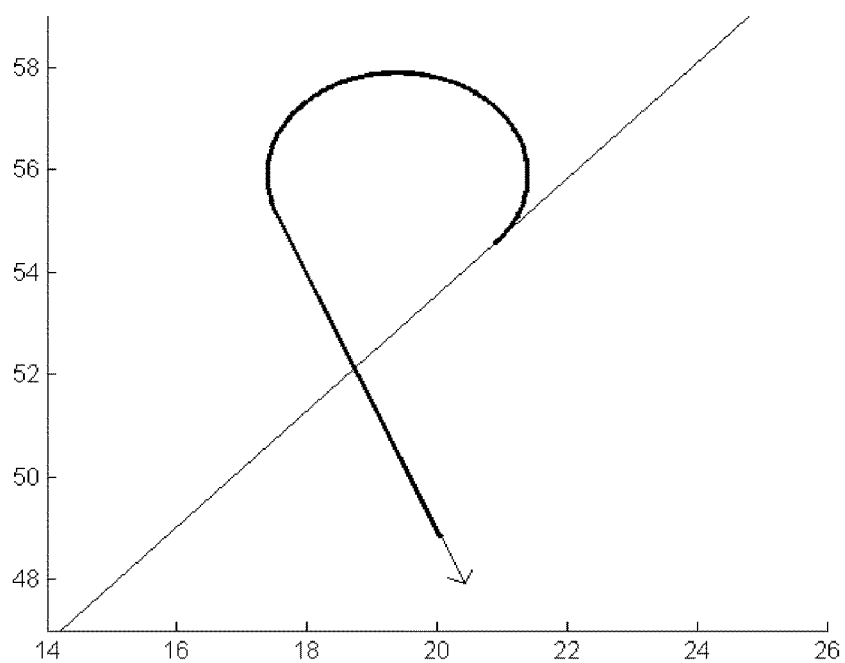
Figure 23B:
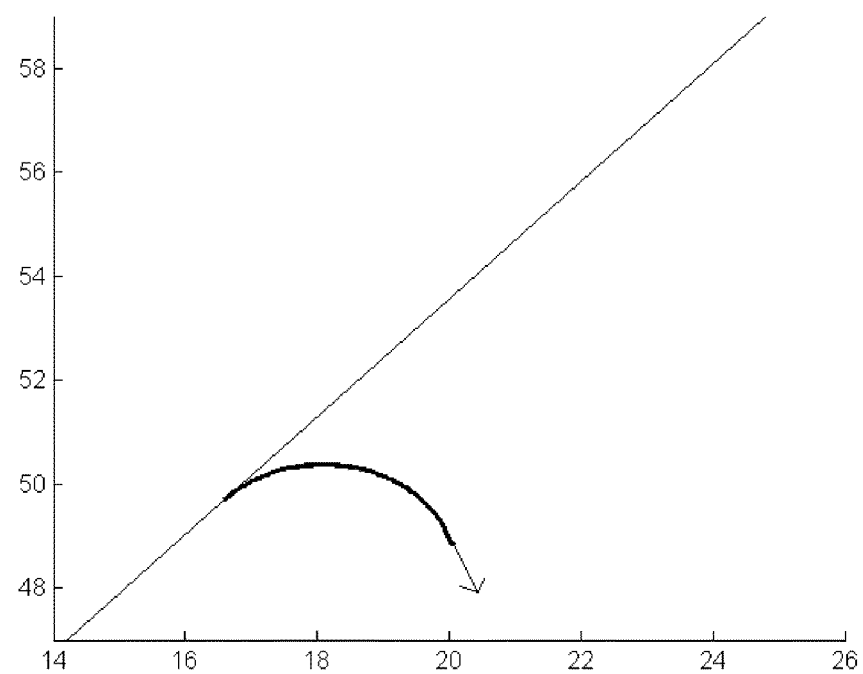
Figure 23C:
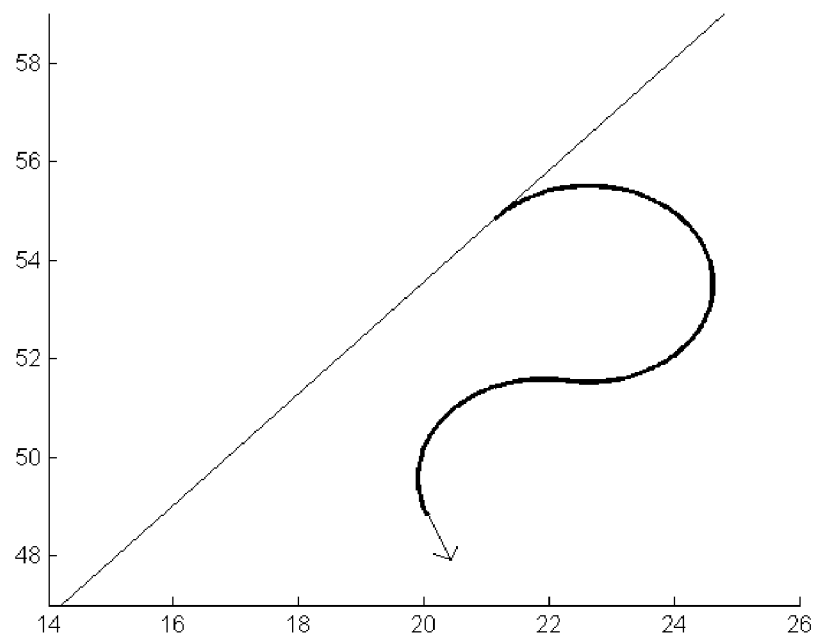
Figure 23D:
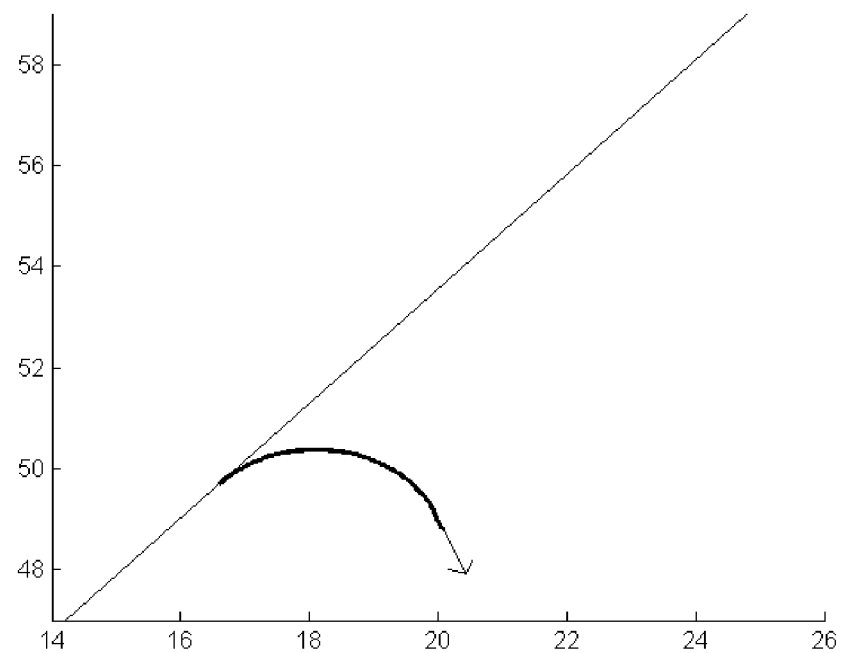

Another working row is defined at a distance of two times the working width, in the direction perpendicular the driving direction, from the originally defined working row. It has two driven paths, as explained earlier, with one of its driven paths beginning at $^3SDR\_^1$=[20.06 48.84]. There are four possible connections between the headland driven path and the working row driven path, see FIG. 23 (a)-(d). FIGS. 23(a) and 23(b) are type 1 connections while 23(c) and 23(d) are type 2 connections.

The paths are also described in the Table 5 below.

TABLE 5

| i | Start point ($sp_i$) | Start direction ($sd_i$) | Length ($l_i$) | Centre of Rotation ($cr_i$) |
|---|---|---|---|---|
| a | | | | |
| 1 | [20.89, 54.57] | [0.66, 0.75] | 8.5 | [19.39, 55.89] |
| 2 | [17.53, 55.15] | [0.37, −0.93] | 6.8 | ~ |
| b | | | | |
| 1 | [16.59, 49.70] | [0.66, 0.75] | 4.08 | [18.09, 48.38] |
| 2 | [19.95, 49.12] | [0.37, −0.93] | 0.6 | ~ |
| c | | | | |
| 1 | [21.13, 54.84] | [0.66, 0.75] | 8.34 | [22.63, 53.52] |
| 2 | [22.27, 51.55] | [0.98, −0.18] | 4.26 | [21.92, 49.58] |
| d | | | | |
| 1 | [16.60, 49.71] | [0.66, 0.75] | 4.22 | [18.10, 48.39] |
| 2 | [20.01, 48.99] | [−0.30, 0.95] | 0.16 | [21.92, 49.58] |

The field gates are also connected to, and from, the headland driven paths in the same way.

Cost Matrix

The connection from one working row driven path to another can be found if the first working row driven path connects to a specified headland driven path and the specified headland driven path also connects to the second working row driven path. In this way, upon leaving the first working row driven path the vehicle can follow the specified headland driven path until it is able to enter the second working row driven path. Since there are multiple ways for each working row driven path to connect to, and to be connected to from, each headland driven path and since there is the possible of multiple headland driven paths, there are many ways in which two working row driven paths can be connected.

A cost matrix is built up of the minimal distance to connect two working row driven path, the field gates are also included in this cost matrix. The ends of the working row driven paths are not able to connect to themselves; therefore, the minimal distance between them is set to infinity. In addition, two working row driven paths that cover the same working row are not able to be connected (this would not make sense since it would mean the working row was worked twice), therefore their connection in the cost matrix is also set to infinity.

The two working row driven path ends, whose connections were described earlier, are $^1EDR_+^1$ and $^3SDR_-^1$. Both of these ends connect to and from, respectively, the same headland driven path; therefore, they can be connected. Fitting the turns together, going from one working row driven path end along the headland driven path and then into another working row driven path, can be done a number of ways. Since there are three connections from $^1EDR_+^1$ to the headland driven path and there are four connections from the headland driven path to $^3SDR_-^1$, then there are twelve possible connections between the two working row driven paths. Table 6 below describes the lengths of all of the possible connections.

TABLE 6

|  |  | $^1EDR_+^1$ | | |
|---|---|---|---|---|
|  |  | a | b | c |
| $^3SDR_-^1$ | a | 40.84 | 40.60 | 28.26 |
|  | b | 23.44 | 23.19 | 10.86 |
|  | c | 38.52 | 38.27 | 25.94 |
|  | d | 23.46 | 23.21 | 10.88 |

Figure 22:
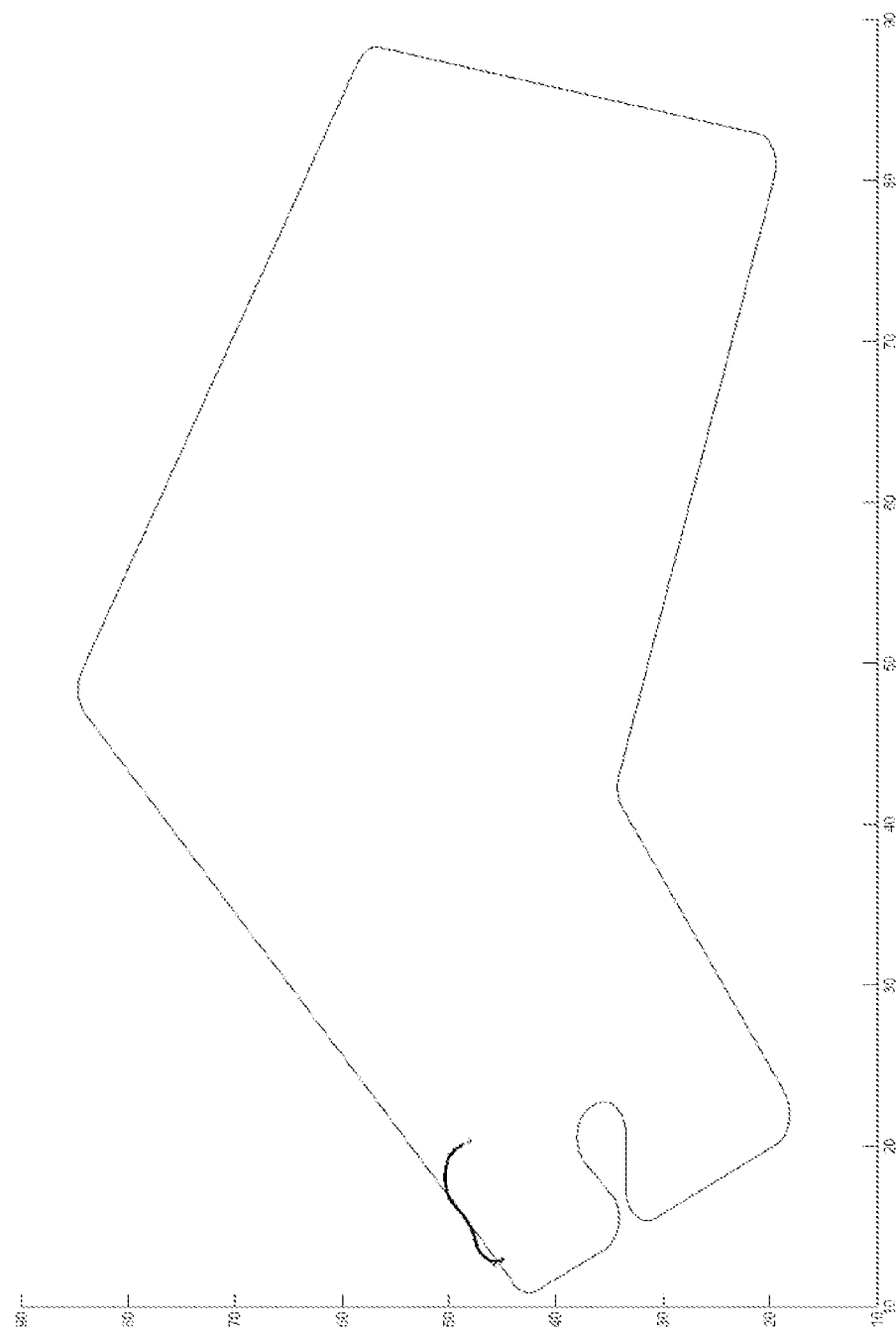

As can be seen from Table 6, the shortest connection from $^1EDR_+^1$ to $^3SDR_-^1$ is by using connection c and then connection b. The path of the connection is shown in FIG. 22 and described in Table 7 below.

TABLE 7

| i | Start point ($sp_i$) | Start direction ($sd_i$) | Length ($l_i$) | Centre of Rotation ($cr_i$) |
|---|---|---|---|---|
| 1 | [13.01, 44.93] | [−0.37, 0.93] | 1.08 | [14.87, 45.67] |
| 2 | [12.90, 45.99] | [0.16, 0.99] | 11.44 | [10.92, 46.31] |
| 3 | [15.25, 48.19] | [0.66, 0.75] | 2.02 | ~ |
| 4 | [16.59, 49.70] | [0.66, 0.75] | 4.08 | [18.09, 48.38] |
| 5 | [19.95, 49.12] | [0.37, −0.93] | 0.6 | ~ |

The cost matrix for a portion of the field is chosen below.

|  | $^1DR_+^1$ | $^1DR_-^1$ | $^3DR_+^1$ | $^3DR_-^1$ | $^5DR_+^1$ | $^5DR_-^1$ | $G^1$ |
|---|---|---|---|---|---|---|---|
| $^1DR_+^1$ | ~ | ~ | 50.59 | 10.86 | 43.62 | 17.59 | 18.98 |
| $^1DR_-^1$ | ~ | ~ | 28.57 | 27.12 | 25.94 | 33.84 | 19.54 |
| $^3DR_+^1$ | 26.08 | 18.43 | ~ | ~ | 36.90 | 10.87 | 32.05 |
| $^3DR_-^1$ | 45.72 | 45.41 | ~ | ~ | 17.98 | 44.95 | 199.93 |
| $^5DR_+^1$ | 32.79 | 18.02 | 46.91 | 18.43 | ~ | ~ | 54.24 |
| $^5DR_-^1$ | 52.06 | 51.75 | 11.09 | 46.09 | ~ | ~ | 75.76 |
| $G^1$ | 18.72 | 18.41 | 235.60 | 28.25 | 76.01 | 49.97 | ~ |

The cost matrix can be used to determine a feasible route to navigate the field. Since the problem to find the optimal route to navigate the field can be considered an NP-hard problem (i.e., it may not be possible to find a solution in a nominal time frame), the heuristic solvers can be used to find a near optimal route. The solver must also account for the fact working row driven paths are associated to one another by the working row they cover.

In this example, a greedy heuristic method is used to find a route to navigate the field. This method provides a simple estimate of what the optimal solution might be. However, different solvers could be used, such as a tabu search solver, ant colony solver, genetic algorithms, etc., to give similar results.

Firstly a starting gate is chosen. The gate is chosen by considering all the connections from gates to the working row driven paths. The connections to the working row driven paths are in the rows labelled for each gate. The gate that has the shortest connection to any working row driven path is chosen as the starting gate and the working row driven path is chosen as the first working row driven path in the route. Since this working row driven path has been chosen as a "destination," it cannot be chosen as a destination from another working row driven path again; therefore, all the values in the column associated with it are set to infinity. Also, the other working row driven path associated with the same working row cannot be chosen, either as a destination or a start so all of the values in both the column and the row associated with the other working row driven path are also set to infinity.

The first working row driven path is now considered the start point and shortest connection from it to another working row driven path is now sought after. The shortest connection is that in the row associated with the first working row driven path with the lowest value. The working row driven path with the lowest value is considered the second working row driven path in the route. Again, all of the values in the column associated with the second working row driven path and that of the working row driven path associated with the same working row are set to infinity as is the row of values of the working row driven path associated with the same working row. This method continues until only the gates remain as possible destinations. The sum of all of the chosen connections is the estimation of the non-working distance needed to navigate the field.

Additionally a further heuristic solver could be used to improve upon the solution offered by the greedy solution and to find a solution nearer to the optimal solution. The tabu search method takes and initial solution and manipulates it with the aim to find better global solutions without becoming "locked in" to locally optimal solutions.

The tabu search is setup by setting an initial solution to the current local solution and the global solution. The iterative process then begins and a number of "moves" are used to determine a local neighborhood of solutions around the local solution. The moves used could be switching the direction of a row, or changing the entrance or exit, or switching the order of two rows adjacent in the solution.

From the generated neighborhood of solutions the best new, non-tabu, solutions is chosen. This new solution now becomes the local solution for the next iteration. The move used to generate the new solution is set to be tabu for a number of iterations, meaning the same move will not be used again for some time. This stops the local solution from becoming stagnant and increases the diversity of the algorithm while also helping to find a globally optimal solution. If the new solution is better than the current global solution then the new solution is also set as the global solution. If the new solution is not better than the global solution for a number of iterations the moves are intensified to find different solutions. The intensification alters the moves differently such that small groups of rows adjacent in the solution have the move expressed upon rather than one row at a time. Due to this there is a limit to the amount of intensification that can be applied to the moves, i.e., if the small group of rows is over half of the available rows. As such when the limit of the intensification is reached the tabu search is finished and an improved solution is returned.

Objective Function Parameterization

To relate the estimation of the non-working distance, ENWD, to basic properties of the field a simplified model was developed.

Figure 9:
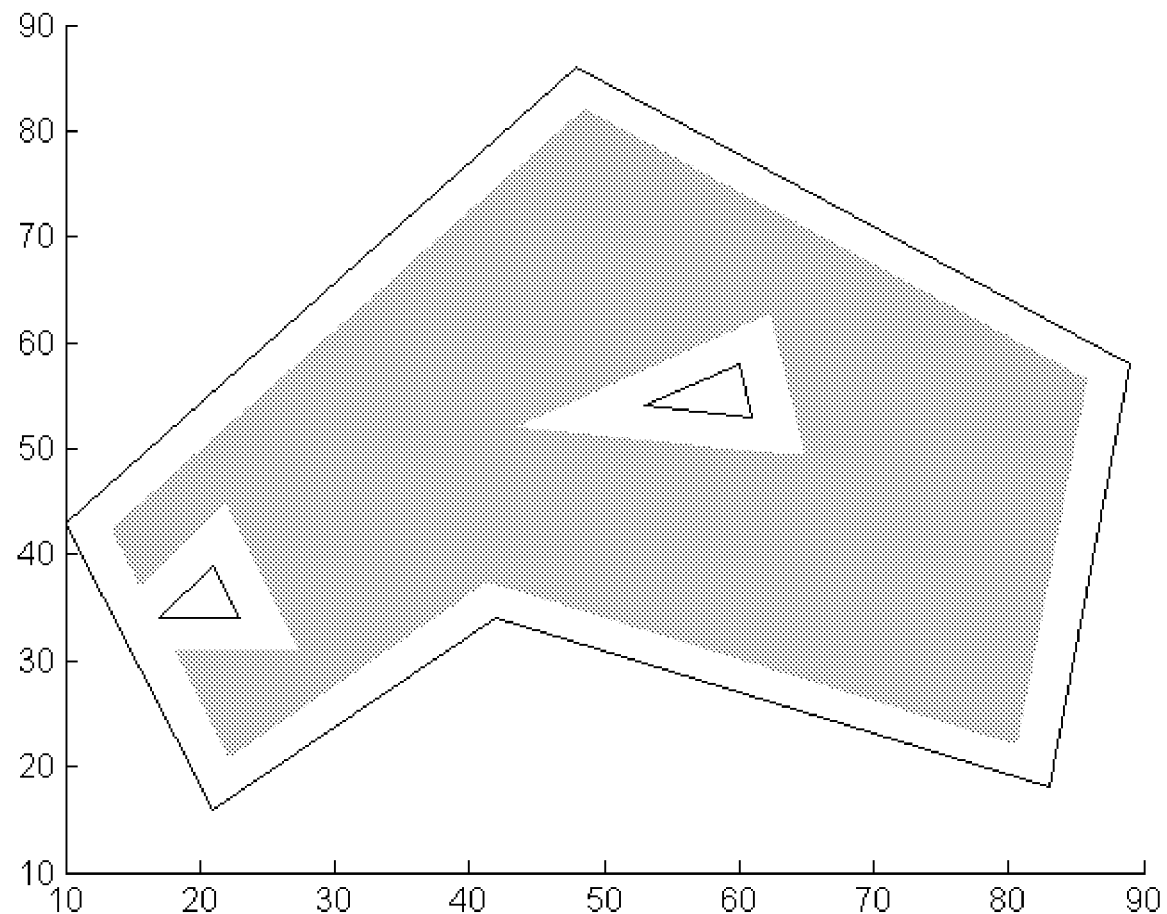

The set of generated working rows are calculated using the previously defined methods. For each possible driving direction of the field, where $DD=D_d$, the produced set of working rows are assessed on the following criteria:

Area of the working area, as shown in FIG. 9=WA
Number of rows=$NR_d$=number of WR for $D_d$
Total area of rows=$TWRA_d = \Sigma_{i=0}^{n}$ area of $WR^i$
Width of the area if the direction perpendicular to the driving direction=$OW_d = \max\{DD^\perp \circ P_j\} - \min\{DD^\perp \circ P_j\}_j$.

Average row length =

$$AR_d = \frac{1}{NR} \sum_{i=0}^{n} \max\{DD \circ ({}^iRCA_j^k - L_1^i)\}_j - \min\{DD \circ ({}^iRCA_j^k - L_1^i)\}_j$$

Longest row length =

$$LR_d = \max\{\max\{DD \circ ({}^iRCA_j^k - L_1^i)\}_j - \min\{DD \circ ({}^iRCA_j^k - L_1^i)\}_j\}_i$$

Shortest row length =

$$SR_d = \min\{\max\{DD \circ ({}^iRCA_j^k - L_1^i)\}_j - \min\{DD \circ ({}^iRCA_j^k - L_1^i)\}_j\}_i$$

The number of rows produced by each driving direction ($NR_d$) are ranked, $NRR_d$, so that for the set with the least number of rows $NRR_d=0$, and for the set with the most number of rows $NRR_d$=number of possible driving directions. NRR is then normalized by dividing each number by the number of possible driving directions so that $0 \leq NRR_d \leq 1$.

Therefore, the basic model for predicting ENWD is as follows:

$$ENWD_d = \lambda_1 WA + \lambda_2 NR_d + \lambda_3 TWRA_d + \lambda_4 OW + \lambda_5 AR_d + \lambda_6 LR_d + \lambda_7 SR_d + \lambda_8 NRR_d$$

$$\text{Optimal } DD = \min\{ENWD_d\}_d$$

Parameterization of the Objective Function

The parameters of the objective function are set empirically by testing numerous driving directions on a large set of real fields. The real fields were taken from the set of Danish fields registered with the government. For each field and driving direction an estimation of the optimal non-working distance was made using the described methods, the parameter of the objective function area also calculated. Finally a regression algorithm is used to determine the parameterization of the objective function.

Example 2

This example illustrates the present disclosure. This example illustrates in a simplified and idealized way how the disclosure is to be conducted.

Figure 24:
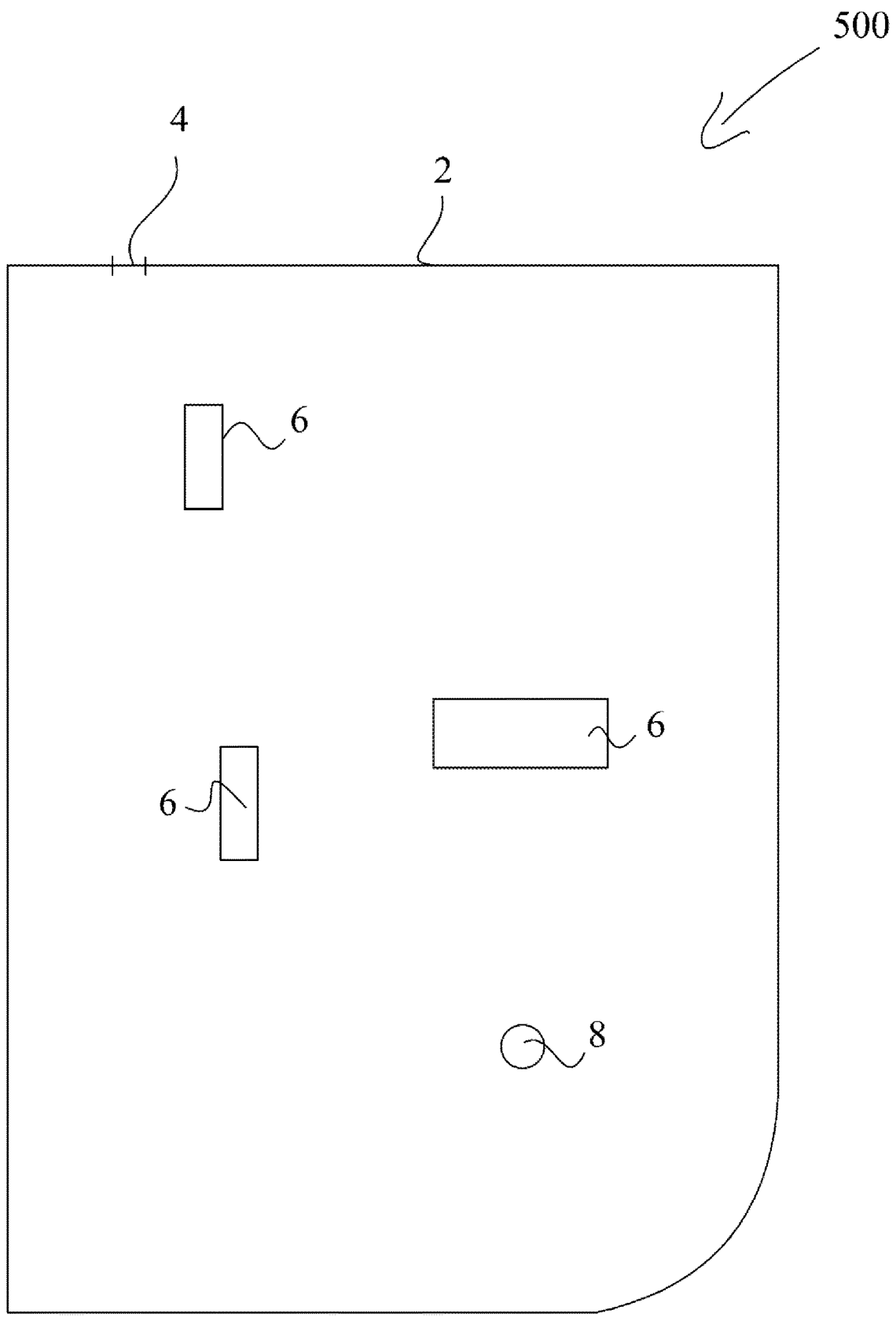
FIGS. 24-30 illustrate the individual steps associated with performing one embodiment of the method according to the present disclosure.

In this example, a crop field comprising a number of distinct weed areas is defined. FIG. 24 illustrates the field to work. The field 500 is constrained within a field boundary 2. At a specific location on the field boundary 2 an entrance/exit gate 4 is located.

The field boundary comprises two pairs of parallel lines. In the lower right corner in FIG. 24 two perpendicular boundary lines are connected by a circular path.

Within the field boundary, three distinct areas 6 of weed areas are present. Additionally, an obstacle 8, which must be avoided when working the field, is located within the field boundary 2.

In this example of performing the method of the disclosure, first, the field boundary is approximated to the shape of a polygon. This is illustrated in FIG. 25.

Figure 25:
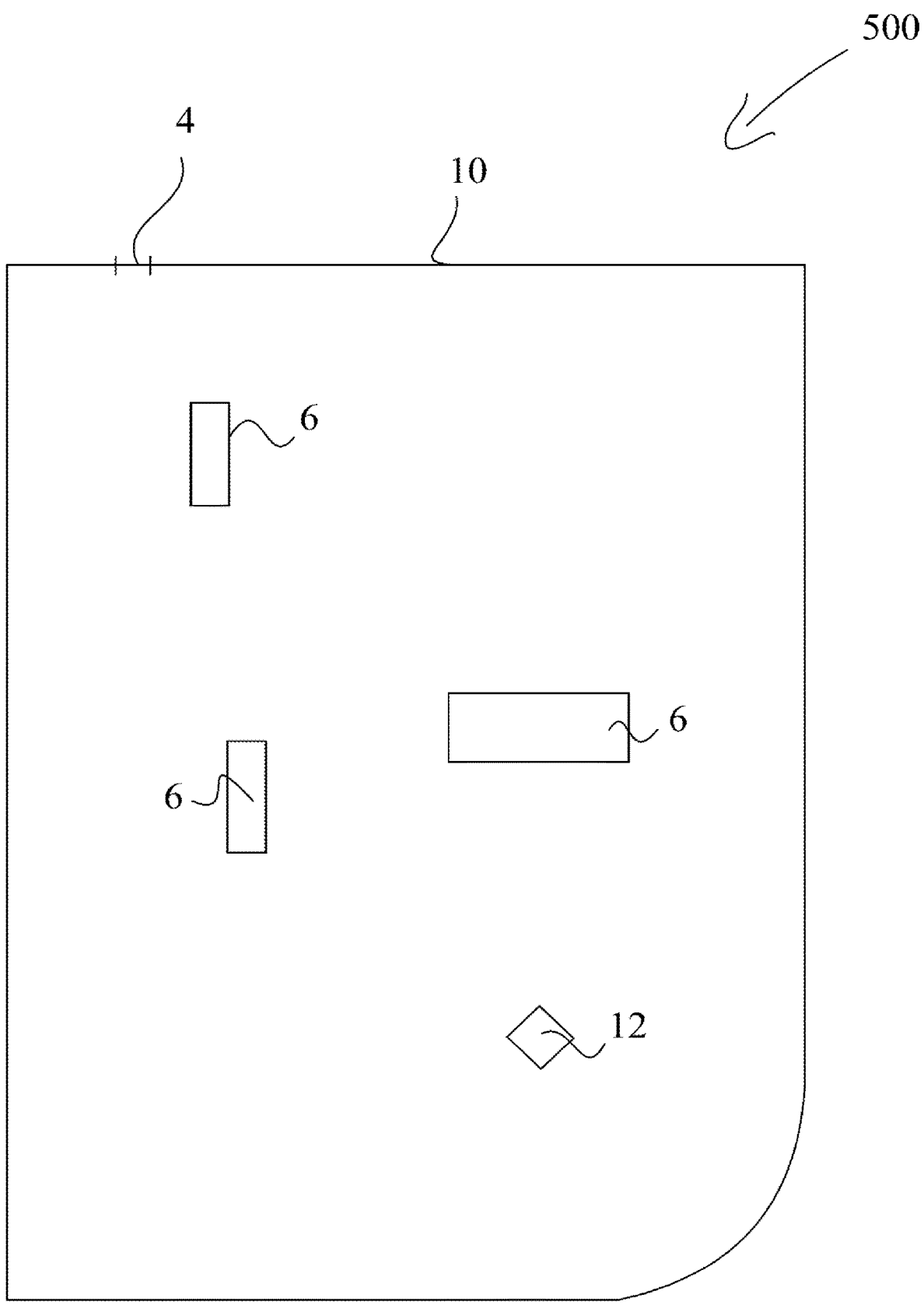

FIG. 25 shows that the field boundary 2 of FIG. 24 has been approximated to a polygon. This polygon is defined as the boundary polygon 10. It is seen that the original circular path in the lower right corner of the field has been exchanged with three linear segments.

Also the obstacle 8 has been approximated to an obstacle polygon 12. The shape of the obstacle polygon corresponds to a square encompassing the shape of obstacle 8 itself.

Figure 26:
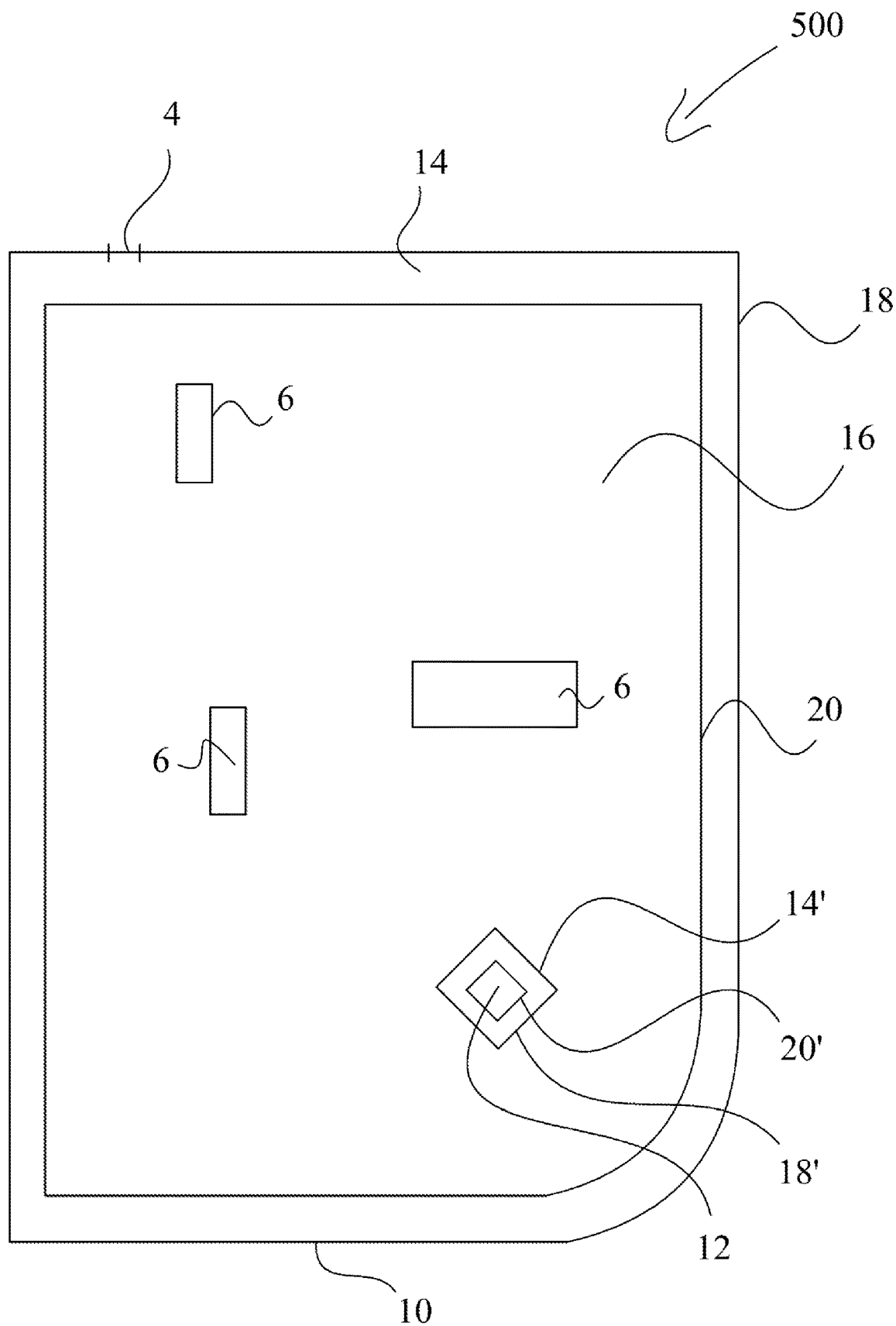

The next step in the method is to define one or more headlands. This is illustrated in FIG. 26. In FIG. 26 a headland 14 is defined immediately within the boundary polygon 10. The headland 14 is having a width corresponding to the effective working width of the working implement to weed the weed areas. Accordingly, the headland 14 is having an outer periphery 18 corresponding to the boundary polygon 10. Further, the headland 14 defines an inner periphery 20 arranged at a distance corresponding to an effective working width from the outer periphery 18.

Additionally, a headland 14' is defined around the obstacle 8. The headland 14' is constrained within an outer periphery 18' and an inner periphery 20' of the headland 14'.

The area of the field 500 that is not a headland 14, 14' and that is not an obstacle 8 is defined as the work area 16. Accordingly, in the general case distinct areas of weed to be worked may be located in a headland or in the work area. In the present example, however, such distinct areas of weed to be worked are only located within the mainland.

It is seen in FIG. 26 that the polygon approximation of the boundary polygon and the obstacle polygon comprises eleven different linear segments (seven in respect of the boundary polygon and four in respect of the obstacle polygon.

As some of these eleven different linear segments are parallel, these eleven different linear segments define a total of six different orientations of linear segments (five in respect of the boundary polygon and one in respect of the obstacle polygon (or alternatively, two in respect of the obstacle polygon and four in respect of the boundary polygon)).

In the nest step we wish to create, within the work area, an array of possible work rows to be followed by the working vehicle. For the sake of simplicity we wish the possible work rows to be parallel to a side of a boundary polygon or of an obstacle polygon. In the present example, it is desired that the work rows have a width corresponding to the effective working width of the implement intended to work the field.

Accordingly, in the present example, the work rows of the work area may be oriented in six different orientations.

Figure 27:
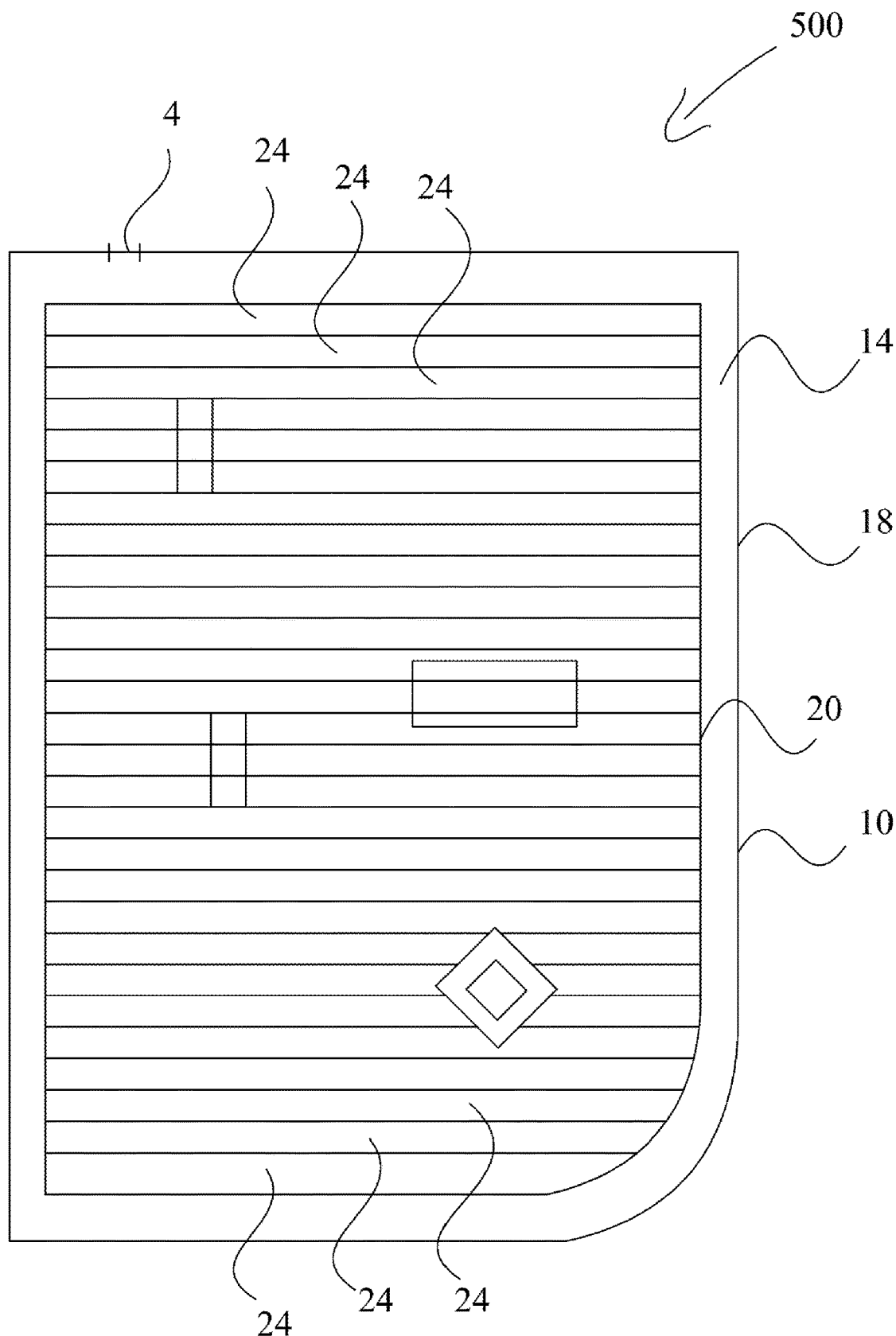

FIG. 27 illustrates one example of defining an array of possible work rows. FIG. 27 shows that the work rows 24 are all oriented parallel to the upper linear segment of the boundary polygon 10.

Figure 28:
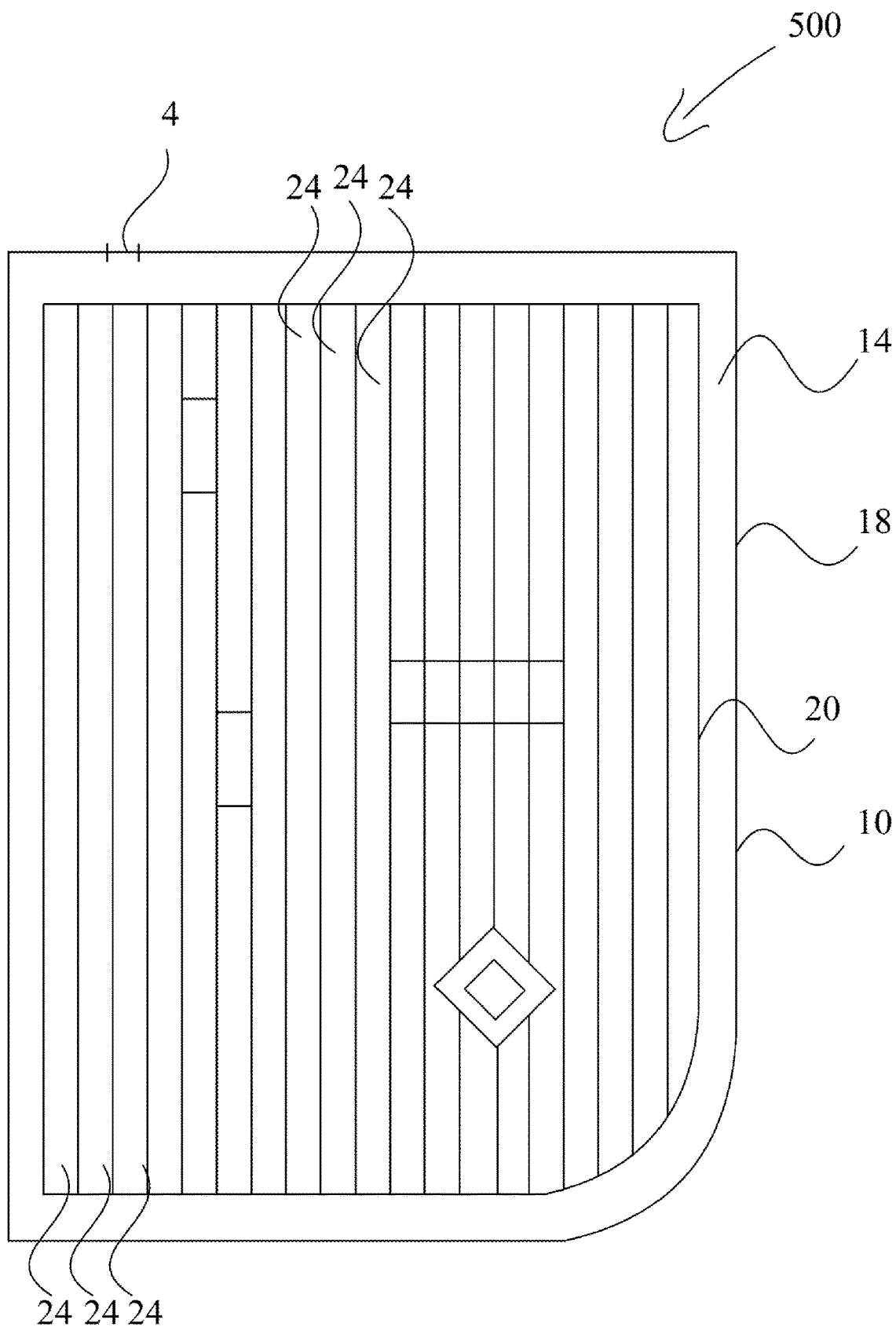

Another example of a definition of an array of possible work rows is shown in FIG. 28. FIG. 28 shows that the work rows 24 are all oriented parallel to the left linear segment of the boundary polygon 10.

Likewise, similar arrays of possible work rows will be defined in respect of the remaining four of the six possible orientations, which are parallel to a field boundary or to an obstacle boundary.

In this example, the further steps are only illustrated with reference to the work rows defined as shown in FIG. 27.

Now, in the work area, we only wish to drive through areas that contain weed. Therefore, the next step is to eliminate from the array of work rows, those work rows that do not cover weed areas.

Figure 29:
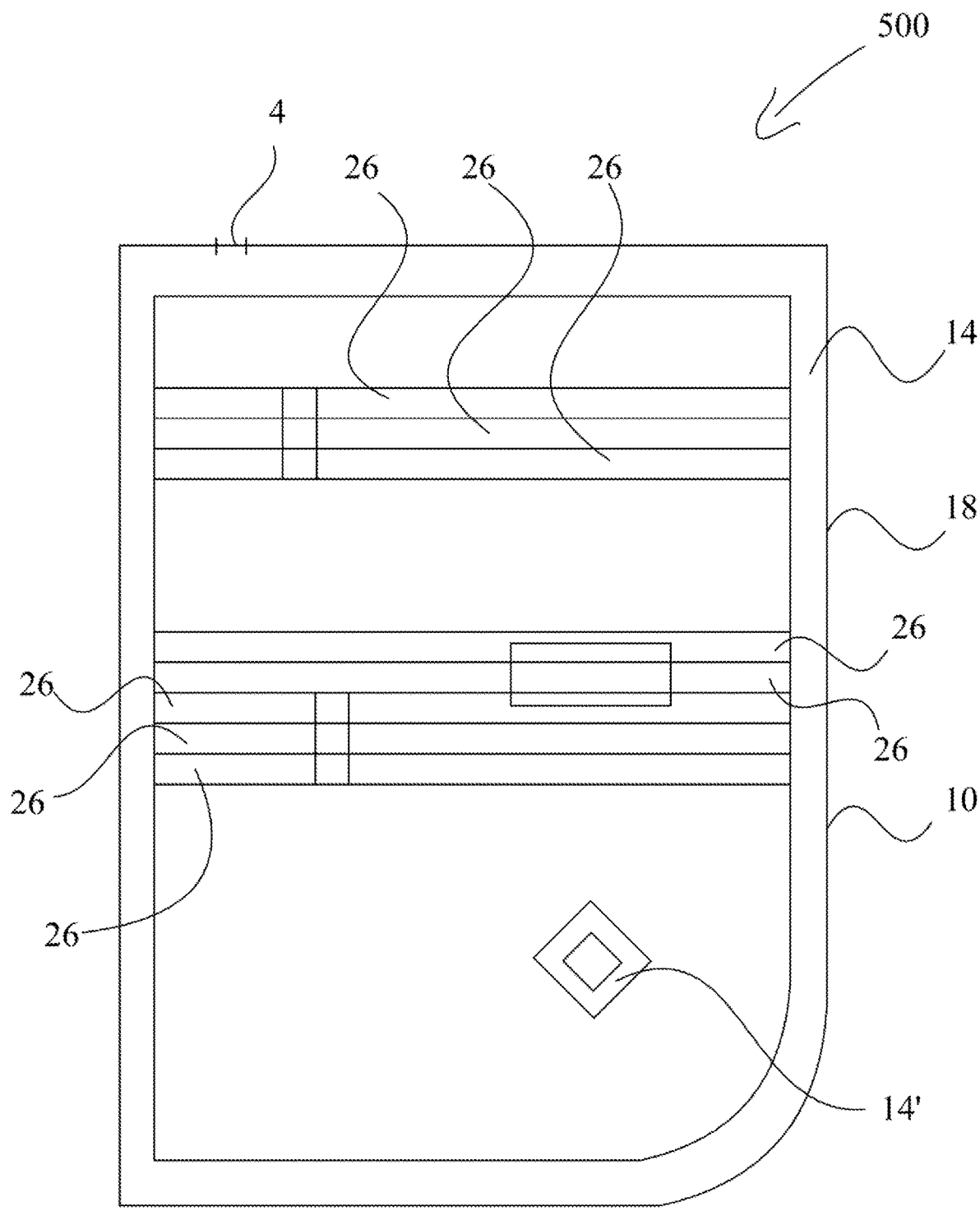

This situation is illustrated in FIG. 29. The array of work rows shown in FIG. 29 has been reduced to only eight weed rows 26.

The next step of the method is to connect in a number of possible ways weed rows with head lands so as result in an array of possible continuous driving path for weeding the weed areas within crop field.

Figure 30:
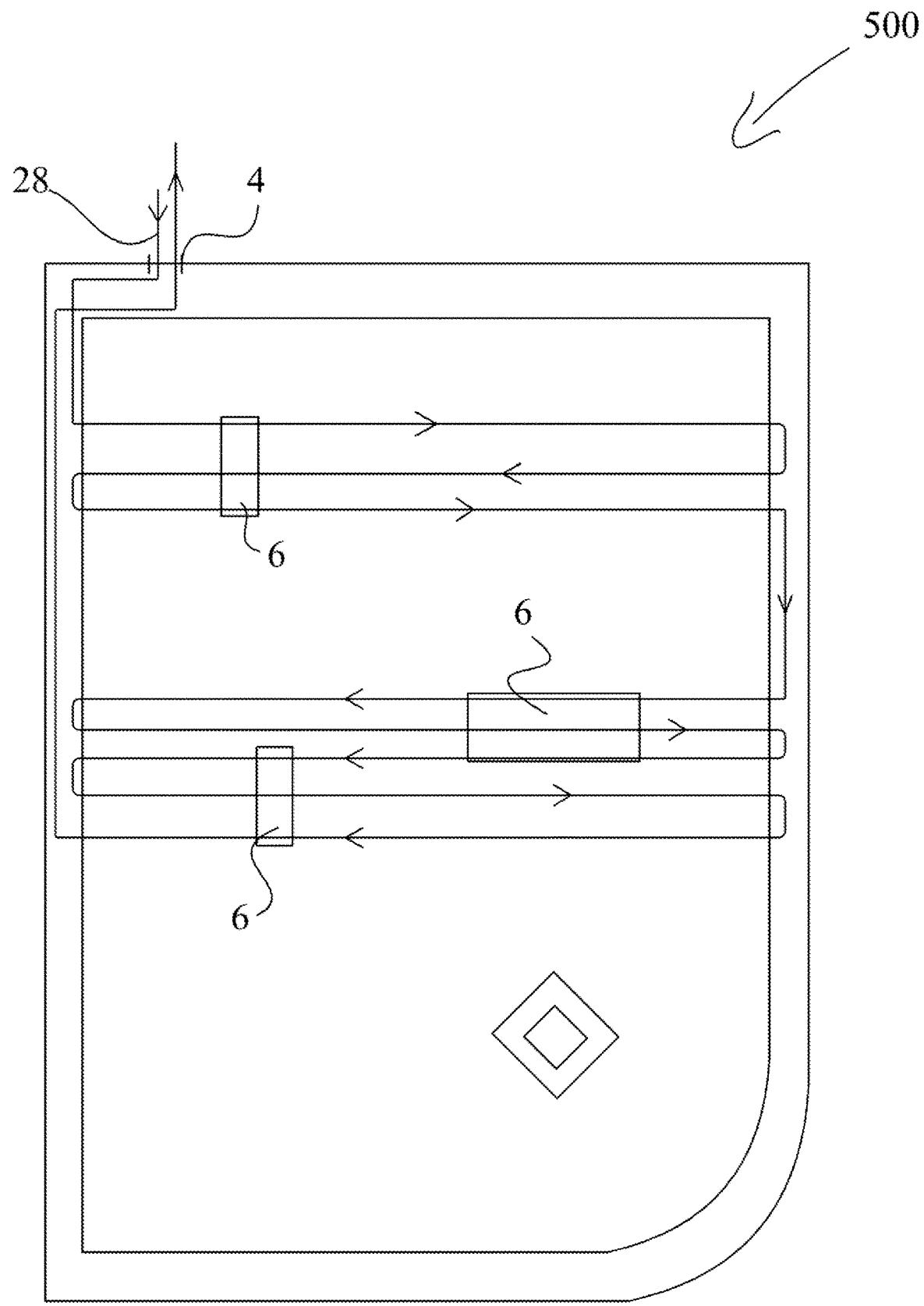

One example of possible continuous driving path defined in respect of the orientation of the work rows as illustrated in FIG. 27 is illustrated in FIG. 30.

In respect of each such possible continuous driving path in the array of possible continuous driving paths as defined in respect of each possible orientation of work rows, a cost parameter may be defined and the total cost of following each possible continuous driving path can be calculated.

The optimized driving path to follow will be that driving path exhibiting the lowest total cost.

Figure 31:
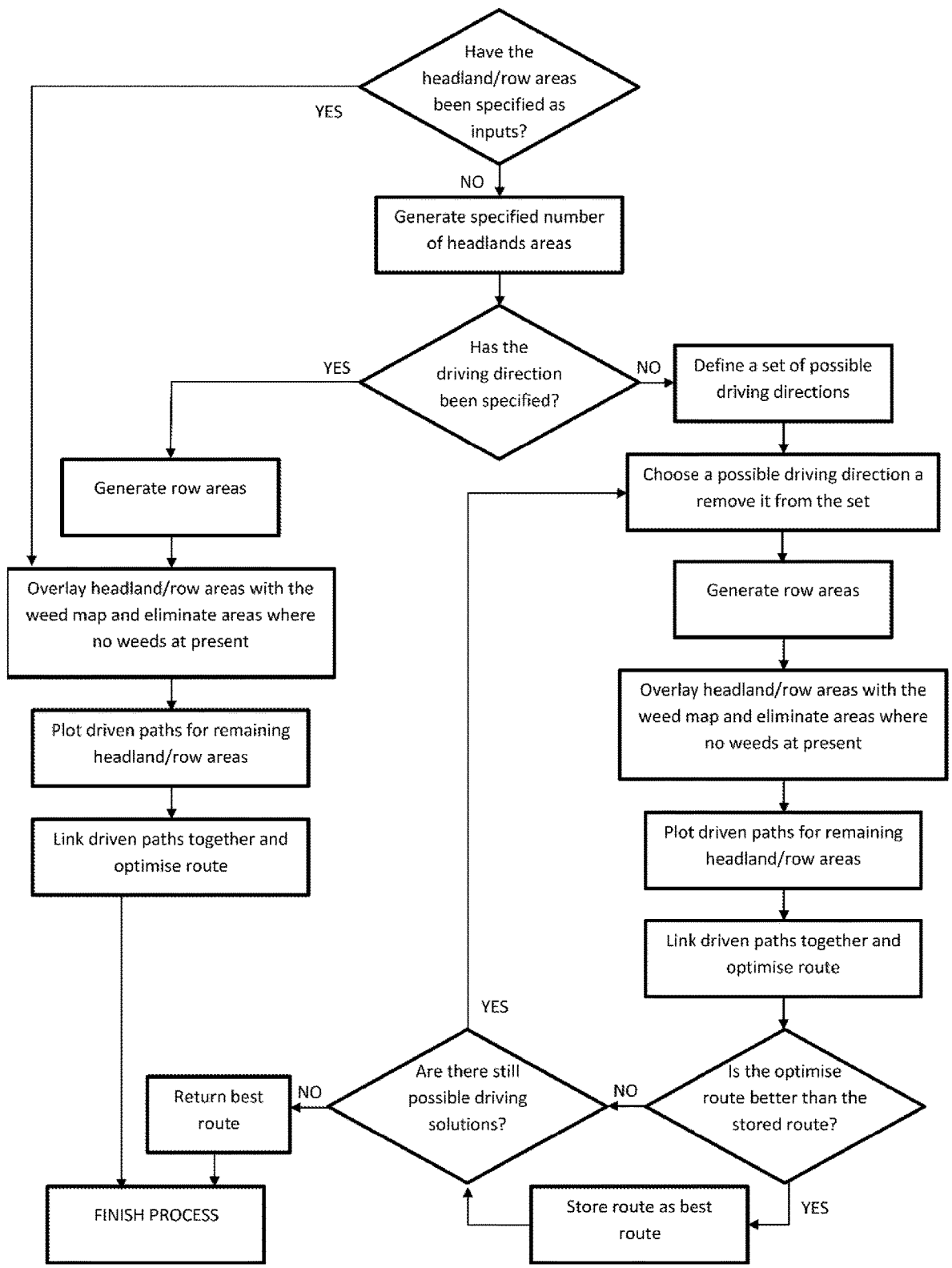
FIG. 31 is a flow diagram illustrating an iterative procedure for use in one embodiment of the method according to the present disclosure.

The flow diagram shown in FIG. 31 illustrates one example of the individual process steps to be followed in finding an optimized trajectory prior to weeding an agricultural cultural field comprising distinct areas of weed infestations.

The disclosure may be further explained with reference to the items 1-39 set out below:

Item 1: A support system for determining a trajectory to be followed by an agricultural work vehicle, when weeding distinct areas of weed within a field of crops, the system comprising:
- a mapping unit configured for receiving:
    i) coordinates relating to the boundaries of a field to be worked; and
    ii) coordinates relating to the boundaries of distinct areas of weed being located within the boundary of the field of crops;
- a capacity parameter unit configured for receiving one or more capacity parameters relating to the working vehicle;
- a trajectory calculating unit configured for calculating an optimized trajectory to be followed by the work vehicle upon weeding the distinct areas of weed;

wherein the optimized trajectory is being calculated on the basis of the coordinates received by the mapping unit; and one or more of the one or more capacity parameters received by the capacity parameter unit.

Item 2: A support system according to item 1, wherein the mapping unit furthermore is configured for receiving:
    iii) coordinates relating to the possible entrance/exit gates of the field; and/or
    iv) coordinates relating to the boundaries of one or more obstacles to be avoided by the work vehicle; wherein the one or more obstacles are located within the field.

Item 3: A support system according to item 1 or 2, wherein the optimized trajectory is an optimized trajectory in terms of total operational time for working the field; total productive time for working the field; total fuel consumption for working the field; total non-working distance for working the field; total distance travelled twice or more; total distance travelled through areas of non-weed crops; total area covered twice more.

Item 4: A support system according to any of the items 1-3, wherein the one or more capacity parameters being selected from the group comprising: effective working width of the work vehicle or the working implement, load of work vehicle as a function of distance travelled, fuel consumption as a function of distance travelled, minimum turning radius of vehicle or implement, or both.

Item 5: A support system according to any of the items 1-4 further comprising a display unit configured to be able to show on a map of the field, the optimized trajectory to be followed by the work vehicle as calculated by the trajectory calculating unit.

Item 6: A support system according to any of the items 1-5, wherein the mapping unit is being configured for storing, in respect of one or more specific fields, one or more of: i) coordinates relating to the boundaries of the one or more specific fields; ii) coordinates relating to the possible entrance/exit gates of the one or more specific fields, iii) coordinates relating to boundaries of obstacles being present on the field; iv) coordinates relating to areas of previous year's or previous years' weed infestations.

Item 7: A support system according to any of the items 1-6, wherein the trajectory calculating unit is configured to calculate an optimized trajectory analytically or numerically.

Item 8: A support system according to any of the preceding items, wherein the trajectory calculating unit is configured to find a number of candidate trajectories, and wherein the trajectory calculating unit is configured to calculate, in respect of each candidate trajectory, an efficiency parameter, and wherein the trajectory calculating unit is configured to suggest to the user that specific candidate trajectory that exhibits the highest efficiency parameter.

Item 9: A support system according to item any of the preceding items, wherein the trajectory calculating unit is being configured to perform the following steps:
    a) approximating the coordinates relating to the boundaries of the field to be worked to a boundary polygon; and wherein the support system is being configured to determine the trajectory to be followed, based on that approximation;
    b) approximating the coordinates relating to the boundaries of each the one or more obstacles, if any, to respective obstacle polygons; and wherein the support system is being configured to determine the trajectory to be followed, based on that approximation;
    c) defining one or more headlands located immediately within the boundary polygon;
    d) in respect of each obstacle polygon, if present, defining one or more headlands surrounding the obstacle polygon;
    e) defining a work area that corresponds to the area within the boundary polygon with the exclusion of the area corresponding to any headlands and with the exclusion of the area corresponding to any obstacle polygon;

f) in respect of the orientation of one or more sides of headlands, define an array of parallel working rows located within the work area;

g) define a number of weed rows, wherein a weed row is being either a headland comprising at least part of a distinct weed area, or being a working row comprising at least part of a distinct weed area.

h) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths; wherein each possible continuous driving path comprises all weed rows;

i) in respect of each of the possible continuous driving paths defined in step h), calculate an associated cost parameter, the calculated cost parameter being representative of the efficiency by following that specific continuous driving path;

j) select as the trajectory to be followed, that specific continuous driving path exhibiting the highest efficiency.

Item 10: A support system according to item 9, wherein step f) is substituted with the following step:

f') define an array of parallel working rows located within the work area, wherein the array of parallel working rows are already existing working rows that have been used in the field.

Item 11: A support system according to item 9 or 10, wherein the trajectory calculating unit is configured to create a possible continuous path by first choosing a particular entrance/exit gate.

Item 12: A support system according to any of the items 9-11, wherein in respect of one or more of the obstacle polygons, if any obstacles are present, the headland surrounding the obstacle polygon includes a safety offset area surrounding the obstacle polygon.

Item 13: A support system according to any of the items 9-12, wherein each working row and/or each headland independently are having a width corresponding to the effective working width of the work vehicle or working implement.

Item 14: A support system according to any of the items 9-13, wherein the support system is configured for defining a number of possible continues driven paths, each comprising a sequence of straight line segments and arched line segments.

Item 15: A support system according to any of the preceding items, wherein the support system is being configured to find the optimized trajectory by means of a heuristic method, such as a greedy heuristic method, a tabu search solver, an ant colony solver, a genetic algorithm.

Item 16: A support system according to any of the items 9-15, wherein the support system is being configured to create a number N of possible continuous driven paths with an associated assigned cost parameter, and wherein the number N being an integer in the range 1,000-700,000 or more, for example, 2,000-600,000, such as 5,000-500,000, e.g., 10,000-400,000, such as 50,000-300,000 or 100,000-200,000 possible continuous driven paths with an associated assigned cost parameter.

Item 17: A support system according to any of the items 1-6, wherein the system is for use with a chemical weeding implement using a herbicide; or a mechanical weeding implement mechanically working the soil of the weed Item 18: A support system according to any of the preceding items, wherein the support system is configured for automatically providing a signal for supplying to a weeding implement of the work vehicle, the signal being configured to activate/deactivate the weeding implement upon entering/exiting areas of weed to be weeded.

Item 19: A support system according to any of the preceding items, wherein one or more of the mapping unit, the capacity parameter unit and the trajectory calculating unit independently are integrated entities or are separate entities.

Item 20: A method for determining a trajectory to be followed by an agricultural work vehicle, when weeding distinct areas of weed within a field of crops, the method comprising the steps:

a) providing information relating to:
i) coordinates relating to the boundaries of a field to be worked; and
ii) coordinates relating to the boundaries of distinct areas of weed being located within the boundary of the field of crops;

b) providing information relating to:
one or more capacity parameters relating to the working vehicle;

c) performing a calculation of an optimized trajectory to be followed by the work vehicle; wherein the optimized trajectory is calculated on the basis of the coordinates provided in step a) and b).

Item 21: A method according to item 20, wherein step a) furthermore involves providing
iii) coordinates relating to the possible entrance/exit gates of the field; and/or
iv) coordinates relating to the boundaries of one or more obstacles to be avoided by the work vehicle; wherein one or more obstacles is located within the field.

Item 22: A method according to item 20 or 21, wherein the optimized trajectory is an optimized trajectory in terms of total operational time for working the field; total productive time for working the field; total fuel consumption for working the field; total non-working distance for working the field; total distance travelled twice or more; total distance travelled through areas of non-weed crops; total area covered twice or more.

Item 23: A method according to any of the items 20-22, wherein the one or more capacity parameters being selected from the group comprising: effective working width of the work vehicle or the working implement, load of work vehicle as a function of distance travelled, fuel consumption as a function of distance travelled, minimum turning radius of vehicle or implement or both.

Item 24: A method according to any of the items 20-23, wherein the method involves presenting in a graphical presentation, such as being showing on an electronic map, the optimized trajectory to be followed by the work vehicle.

Item 25: A method according to any of the items 20-24 involving calculation of the optimized trajectory analytically or numerically.

Item 26: A method according to any of the items 20-25, the method involves finding a number of candidate trajectories; calculation in respect of each candidate trajectory, an efficiency parameter; and suggesting to a user, that specific candidate trajectory that exhibits the highest efficiency parameter.

Item 27: A method according to any of the items 20-26, wherein the method involves performing the following steps:

a) approximating the coordinates relating to the boundaries of the field to be worked to a boundary polygon; and wherein the support system is being configured to determine the trajectory to be followed, based on that approximation;
b) approximating the coordinates relating to the boundaries of each of the one or more obstacles, if any, to respective obstacle polygons; and wherein the support system is being configured to determine the trajectory to be followed, based on that approximation;
c) defining one or more headlands located immediately within the boundary polygon;
d) in respect of each obstacle polygon, if present, defining one or more headlands surrounding the obstacle polygon;
e) defining a work area that corresponds to the area within the boundary polygon with the exclusion of the area corresponding to any headlands and with the exclusion of the area corresponding to any obstacle polygon;
f) in respect of the orientation of one or more sides of headlands, define an array of parallel working rows located within the work area;
g) define a number of weed rows, wherein a weed row is being either a headland comprising at least part of a distinct weed area, or being a working row comprising at least part of a distinct weed area.
h) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths; wherein each possible continuous driving path comprises all weed rows;
i) in respect of each of the possible continuous driving paths defined in step h), calculate an associated cost parameter, the calculated cost parameter being representative of the efficiency by following that specific continuous driving path;
j) select as the trajectory to be followed, that specific continuous driving path exhibiting the highest efficiency.

Item 28: A method according to item 27, wherein the method involves creation of a possible continuous path by first choosing a particular entrance/exit gate.

Item 29: A method according to item 27 or 28, wherein in respect of one or more of the obstacle polygons, the headland surrounding the obstacle polygon includes a safety offset area surrounding the obstacle polygon.

Item 30: A method according to any of the item 27-29, wherein each working row and/or each headland independently has a width corresponding to the effective working width of the work vehicle or working implement.

Item 31: A method according to any of the item 27-30, wherein the method involves defining a number of possible continuous driven paths, each comprising a sequence of straight line segments and arched line segments.

Item 32: A method according to any of the items 20-31, wherein the method involves finding the optimized trajectory by means of a heuristic method, such as a greedy heuristic method a tabu search solver, an ant colony solver, a genetic algorithm Item 33: A method according to any of the items 26-32, wherein the method involves creating a number N of possible continuous driven paths with an associated assigned cost parameter, and wherein the number N being an integer in the range 1,000-700,000 or more, for example, 2,000-600,000, such as 5,000-500,000, e.g., 10,000-400,000, such as 50,000-300,000 or 100,000-200,000 possible continuous driven paths with an associated assigned cost parameter.

Item 34: A method according to any of the items 20-33, wherein the method is performed by using a support system according to any of the items 1-19.

Item 35: A method according to any of the items 20-34 followed by weeding the field or part of the field by using a weeding implement and by following the optimized trajectory.

Item 36: A computer program product that, when operating on a computer, is adapted to perform the method according to any of the items 20-45.

Item 37: An agricultural work vehicle comprising a support system according to any of the items 1-19.

Item 38: Use of a support system according to any of the items 1-19 or of a computer program product according to item 36 or of an agricultural work vehicle according to item 37 for optimizing a trajectory to be followed by the work vehicle when working a field.

Item 39: Use according to item 38 when weeding a crop field.

LIST OF REFERENCE NUMERALS

2 Boundary of crop field
4 Entrance/exit gate
6 Distinct area of weed within crop field
8 Obstacle within crop field
10 Boundary polygon
12 Obstacle polygon
14, 14' Headland
16 Work area
18, 18' Outer periphery of headland
20, 20' Inner periphery of headland
24 Work row within work area
26 Weed row
28 Possible continuous driving path for weeding the weed within crop field
100 Support system
500 Crop field
D Working implement
MU Mapping unit
CU Capacity parameter unit
TCU Trajectory calculating unit
M Display

The invention claimed is:

1. A support system for determining a trajectory to be followed by an agricultural work vehicle, when weeding distinct areas of weed within a field of crops, the system comprises:
   a mapping unit including at least one processor configured to enable the mapping unit to receive:
      i) coordinates relating to boundaries of a field to be worked; and
      ii) coordinates relating to boundaries of distinct areas of weed being located within the boundary of the field of crops;
   a capacity parameter unit including the at least one processor configured to enable the capacity parameter unit to receive one or more capacity parameters relating to the work vehicle;
   a trajectory calculating unit including the at least one processor configured to enable the trajectory calculating unit to calculate an optimized trajectory to be followed by the work vehicle upon weeding the distinct areas of weed; wherein the optimized trajectory is calculated on a basis of the coordinates received by the mapping unit; and one or more of the one or more capacity parameters received by the capacity parameter unit;

wherein the trajectory calculating unit is configured to perform the following:
  a) approximating the coordinates relating to the boundaries of the field to be worked to a boundary polygon; and wherein the support system is configured to determine the trajectory to be followed, based on that approximation;
  b) approximating the coordinates relating to boundaries of one or more obstacles, if any, to respective obstacle polygons; and wherein the support system is configured to determine the trajectory to be followed, based on that approximation;
  c) defining one or more headlands located immediately within the boundary polygon;
  d) in respect of each obstacle polygon, if present, defining one or more headlands surrounding the obstacle polygon;
  e) defining a work area that corresponds to an area within the boundary polygon with exclusion of an area corresponding to any headlands and with exclusion of an area corresponding to any obstacle polygon;
  f) in respect of orientation of one or more sides of headlands, define an array of parallel working rows located within the work area;
  g) define a number of weed rows, wherein a weed row is either a headland comprising at least part of a distinct weed area, or being a working row comprising at least part of a distinct weed area;
  h) in respect of one or more arrays of parallel working rows defined in act f), define an array of possible continuous driving paths by connecting separate entities, wherein the separate entities is either headlands, or parts of a headland, and working rows, or parts of a working row; so as to define possible continuous driving paths; wherein each possible continuous driving path comprises all weed rows;
  i) in respect of each of the possible continuous driving paths defined in act h), calculate an associated cost parameter, the calculated cost parameter being representative of efficiency by following that specific continuous driving path; and
  j) select as the trajectory to be followed, that specific continuous driving path exhibiting the highest efficiency; and wherein the support system is configured for automatically providing a signal for supplying to a weeding implement of the work vehicle, the signal being configured to activate and/or deactivate the weeding implement upon entering and/or exiting areas of weed to be weeded.

2. A method for determining a trajectory to be followed by an agricultural work vehicle, when weeding distinct areas of weed within a field of crops, the method comprising:
  a) providing information relating to:
    i) coordinates relating to boundaries of a field to be worked; and
    ii) coordinates relating to boundaries of distinct areas of weed being located within the boundary of the field of crops;
  b) providing information relating to:
    i) one or more capacity parameters relating to the work vehicle;
  c) performing a calculation of an optimized trajectory to be followed by the work vehicle; wherein the optimized trajectory is calculated on a basis of the coordinates provided in acts a) and b);

wherein the method involves performing the following:
  a) approximating the coordinates relating to the boundaries of the field to be worked to a boundary polygon; and wherein a support system is configured to determine the trajectory to be followed, based on that approximation;
  b) approximating the coordinates relating to boundaries of one or more obstacles, if any, to respective obstacle polygons; and wherein the support system is configured to determine the trajectory to be followed, based on that approximation;
  c) defining one or more headlands located immediately within the boundary polygon;
  d) in respect of each obstacle polygon, if present, defining one or more headlands surrounding the obstacle polygon;
  e) defining a work area that corresponds to an area within the boundary polygon with exclusion of an area corresponding to any headlands and with exclusion of an area corresponding to any obstacle polygon;
  f) in respect of orientation of one or more sides of headlands, define an array of parallel working rows located within the work area;
  g) define a number of weed rows, wherein a weed row is either a headland comprising at least part of a distinct weed area, or being a working row comprising at least part of a distinct weed area;
  h) in respect of one or more arrays of parallel working rows defined in act f), define an array of possible continuous driving paths by connecting separate entities, wherein the separate entities is either headlands, or parts of a headland, and working rows, or parts of a working row, so as to define possible continuous driving paths; wherein each possible continuous driving path comprises all weed rows;
  i) in respect of each of the possible continuous driving paths defined in act h), calculate an associated cost parameter, the calculated cost parameter being representative of efficiency by following that specific continuous driving path;
  j) select as the trajectory to be followed, that specific continuous driving path exhibiting the highest efficiency; and
  k) weeding the field or part of the field by using a weeding implement and by following the optimized trajectory.

3. A computer readable storage medium having a computer program product that, when operating on a computer, is adapted to perform the method according to claim 2.

4. The support system according to claim 1, wherein the mapping unit furthermore is configured for receiving:
  iii) coordinates relating to possible entrance gates and/or exit gates of the field; and/or
  iv) coordinates relating to the boundaries of one or more obstacles to be avoided by the work vehicle; wherein the one or more obstacles are located within the field.

5. The support system according to claim 1, wherein the optimized trajectory is an optimized trajectory in terms of total operational time for working the field; total productive time for working the field; total fuel consumption for working the field; total non-working distance for working the field; total distance travelled twice or more; total distance travelled through areas of non-weed crops; and total area covered twice more.

6. The support system according to claim 1, wherein the one or more capacity parameters being selected from a group comprise: effective working width of the work vehicle or the working implement, load of work vehicle as a function of distance travelled, fuel consumption as a function of distance travelled, minimum turning radius of vehicle or implement, or both.

7. The support system according to claim 1, wherein the mapping unit is configured for storing, in respect of one or more specific fields, one or more of:
   i) coordinates relating to boundaries of the one or more specific fields;
   ii) coordinates relating to possible entrance gates and/or exit gates of the one or more specific fields;
   iii) coordinates relating to boundaries of obstacles being present on the field; and
   iv) coordinates relating to areas of previous year's or previous years' weed infestations.

8. The support system according to claim 1, wherein the trajectory calculating unit is configured to find a number of candidate trajectories, and wherein the trajectory calculating unit is configured to calculate, in respect of each candidate trajectory, an efficiency parameter, and wherein the trajectory calculating unit is configured to suggest to a user, that specific candidate trajectory that exhibits the highest efficiency parameter.

9. The support system according to claim 1, wherein step f) is substituted with the following step:
   f') define an array of parallel working rows located within the work area, wherein the array of parallel working rows are already existing working rows that have been used in the field.

10. The support system according to claim 1, wherein in respect of one or more of the obstacle polygons, if any obstacles are present, the headland surrounding the obstacle polygon includes a safety offset area surrounding the obstacle polygon.

11. The support system according to claim 1, wherein the support system is configured for defining a number of possible continuous driven paths, each comprising a sequence of straight line segments and arched line segments.

12. The method according to claim 2, wherein step a) furthermore involves providing:
   iii) coordinates relating to possible entrance gates and/or exit gates of the field; and/or
   iv) coordinates relating to the boundaries of one or more obstacles to be avoided by the work vehicle; wherein the one or more obstacles are located within the field.

13. The method according to claim 2, wherein the optimized trajectory is an optimized trajectory in terms of total operational time for working the field; total productive time for working the field; total fuel consumption for working the field; total non-working distance for working the field; total distance travelled twice or more; total distance travelled through areas of non-weed crops; and total area covered twice or more.

14. The method according to claim 2, wherein the one or more capacity parameters being selected from a group comprise: effective working width of the work vehicle or the working implement, load of work vehicle as a function of distance travelled, fuel consumption as a function of distance travelled, minimum turning radius of vehicle or implement or both.

15. The method according to claim 2, wherein the method involves finding a number of candidate trajectories; calculation in respect of each candidate trajectory, an efficiency parameter; and suggesting to a user that specific candidate trajectory that exhibits the highest efficiency parameter.

16. The method according to claim 2, wherein in respect of one or more of the obstacle polygons, the headland surrounding the obstacle polygon includes a safety offset area surrounding the obstacle polygon.

17. The method according to claim 2, wherein the method involves defining a number of possible continuous driven paths, each comprising a sequence of straight line segments and arched line segments.

18. The method according to claim 2, wherein the method is performed by using a support system according to claim 1.

* * * * *

UNITED STATES PATENT AND TRADEMARK OFFICE
CERTIFICATE OF CORRECTION

PATENT NO. : 11,129,323 B2
APPLICATION NO. : 16/338104
DATED : September 28, 2021
INVENTOR(S) : Ole Green and Gareth Thomas Charles Edwards It is certified that error appears in the above-identified patent and that said Letters Patent is hereby corrected as shown below:

In the Specification

| | | |
|---|---|---|
| Column 12, | Line 58, | change "[41,28],[-6,40],[-41,16],[-21,18]" to --[41,-28],[-6,-40],[-41,16],[-21,-18]-- |
| Column 12, | Line 59, | change "([1.16,0.20],[0.16,1.32],[-1.08,0.47]" to --([1.16,-0.20],[0.16,-1.32],[-1.08,-0.47]-- |
| Column 12, | Line 64, | change "distance A" to --distance λ-- |
| Column 17, | Line 44, | change "[-0.62, 0.78]" to --[-0.62,-0.78]-- |
| Column 17, | Line 45, | change "[0.83,0.56], [-0.15,0.99], [-0.93,0.36], [-0.76,0.65]" to --[0.83,-0.56], [-0.15,-0.99], [-0.93,0.36], [-0.76,-0.65]-- |
| Column 17, | Line 46, | change "[-0.87,0.5], [0.99,0.12]" to --[-0.87,-0.5], [0.99,-0.12]-- |
| Column 20, | Line 61, | change "[-0.38,2.47,0.39" to --[-0.38,-2.47,-0.39-- |
| Column 20, | Line 62, | change "2.99,1.2,2.28, 0.39" to -- -2.99,-1.2,-2.28,-0.39-- |

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*